United States Patent
Meier et al.

(10) Patent No.: US 11,723,307 B2
(45) Date of Patent: Aug. 15, 2023

(54) MACHINE OPERATIONAL STATE AND MATERIAL MOVEMENT TRACKING

(71) Applicant: Bitstrata Systems Inc., Saskatoon (CA)

(72) Inventors: Ian Robert Meier, Saskatoon (CA); Michael David Lockerbie, Saskatoon (CA)

(73) Assignee: Bitstrata Systems Inc., Saskatoon (CA)

( * ) Notice: Subject to any disclaimer, the term of this patent is extended or adjusted under 35 U.S.C. 154(b) by 231 days.

(21) Appl. No.: 17/226,320

(22) Filed: Apr. 9, 2021

(65) Prior Publication Data
US 2021/0219493 A1 Jul. 22, 2021

Related U.S. Application Data

(63) Continuation of application No. 16/937,150, filed on Jul. 23, 2020, now Pat. No. 10,999,971, which is a continuation of application No. PCT/CA2019/051509, filed on Oct. 24, 2019.

(60) Provisional application No. 62/749,860, filed on Oct. 24, 2018.

(51) Int. Cl.
| | |
|---|---|
| *A01D 41/127* | (2006.01) |
| *G01G 11/04* | (2006.01) |
| *G07C 5/00* | (2006.01) |
| *H04W 4/029* | (2018.01) |
| *G06Q 10/067* | (2023.01) |
| *G07C 5/02* | (2006.01) |
| *G01C 21/16* | (2006.01) |

(52) U.S. Cl.
CPC ......... *A01D 41/127* (2013.01); *G01C 21/188* (2020.08); *G01G 11/04* (2013.01); *G06Q 10/067* (2013.01); *G07C 5/008* (2013.01); *G07C 5/02* (2013.01); *H04W 4/029* (2018.02)

(58) Field of Classification Search
USPC .......................................................... 701/50
See application file for complete search history.

(56) References Cited

U.S. PATENT DOCUMENTS

| | | | |
|---|---|---|---|
| 6,572,257 B2 | 6/2003 | Bump | |
| 7,211,745 B1 | 5/2007 | Brown | |
| 8,097,820 B2 | 1/2012 | Klubertanz | |
| 8,310,363 B2 | 11/2012 | Breed | |
| 8,934,226 B2 | 1/2015 | Smith | |
| 9,668,411 B1 | 6/2017 | Koch | |
| 9,824,337 B1 | 11/2017 | Rodoni | |
| 9,983,048 B1 * | 5/2018 | Meier | G01G 23/18 |
| 10,485,177 B2 | 11/2019 | Bump | |
| 10,520,351 B2 | 12/2019 | Johansen | |
| 10,545,046 B2 * | 1/2020 | Meier | G01G 13/006 |
| 10,677,637 B1 | 6/2020 | Von Muenster | |
| 10,976,190 B2 * | 4/2021 | Meier | G01G 19/08 |
| 2003/0109993 A1 | 6/2003 | Peat | |
| 2006/0167595 A1 | 7/2006 | Breed | |

(Continued)

OTHER PUBLICATIONS

International Search Report and Written Opinion in PCT/CA2019/051509, dated Dec. 4, 2019, 15 pages.

*Primary Examiner* — Tyler D Paige
(74) *Attorney, Agent, or Firm* — Lempia Summerfield Katz LLC

(57) ABSTRACT

An apparatus, a system and a method indirectly detect the operational state of a machine among a plurality of operational states and track the movement of a material through a plurality of machines.

21 Claims, 13 Drawing Sheets

(56) References Cited

U.S. PATENT DOCUMENTS

| | | | |
|---|---|---|---|
| 2006/0276949 A1* | 12/2006 | Beck | G07C 5/0808 |
| | | | 701/50 |
| 2011/0220677 A1 | 9/2011 | Bertolani | |
| 2012/0099948 A1 | 4/2012 | Bump | |
| 2013/0317696 A1 | 11/2013 | Koch | |
| 2014/0060939 A1 | 3/2014 | Eppert | |
| 2014/0122085 A1 | 5/2014 | Piety | |
| 2014/0196919 A1 | 7/2014 | Kowalchuk | |
| 2014/0208851 A1 | 7/2014 | Bischoff | |
| 2014/0284118 A1 | 9/2014 | Van Mill | |
| 2014/0288789 A1* | 9/2014 | Van Mill | A01D 90/10 |
| | | | 701/50 |
| 2015/0264866 A1* | 9/2015 | Foster | B65G 67/24 |
| | | | 414/21 |
| 2016/0029559 A1 | 2/2016 | Inoue | |
| 2016/0055688 A1 | 2/2016 | Miura | |
| 2016/0226977 A1 | 8/2016 | Fujiwara | |
| 2016/0260059 A1 | 9/2016 | Benjamin | |
| 2016/0339405 A1 | 11/2016 | Bump | |
| 2016/0343231 A1 | 11/2016 | Bump | |
| 2017/0370765 A1 | 12/2017 | Meier | |
| 2018/0061207 A1 | 3/2018 | Nygren | |
| 2018/0106709 A1 | 4/2018 | Cherney | |
| 2018/0242521 A1* | 8/2018 | Thomson | B65G 65/34 |
| 2018/0253956 A1 | 9/2018 | Nygren | |
| 2020/0201292 A1 | 6/2020 | Celia | |
| 2020/0211300 A1 | 7/2020 | Helms | |
| 2020/0284694 A1 | 9/2020 | Scott | |

\* cited by examiner

MACHINE OPERATIONAL STATE AND MATERIAL MOVEMENT TRACKING

CROSS-REFERENCE TO RELATED APPLICATIONS

This application is a continuation of under 37 C.F.R. § 1.53(b) of U.S. patent application Ser. No. 16/937,150 filed Jul. 23, 2020 now U.S. Pat. No. 10,999,971, which claims priority to and the benefit under 37 C.F.R. 1.53(b) and 35 U.S.C. § 365 as a continuation application of PCT Application Serial No. PCT/CA2019/051509, filed on Oct. 24, 2019, and designating the United States, which claims the benefit of the filing date under 35 U.S.C. § 119(e) of U.S. Provisional Application Ser. No. 62/749,860 filed Oct. 24, 2018, the entirety of all of which are hereby incorporated by reference in their entirety and relied upon.

FIELD OF THE DISCLOSURE

The present disclosure relates to an apparatus, a system and a method for detecting the operational state of a machine. More particularly, the present disclosure relates to an apparatus, a system and a method to detect the operational state of a machine that has an onboard weighing and a payload transfer mechanism, and to track the movement of a material through a series of machines.

BACKGROUND

Various vehicles or machines, particularly those designed for the purpose of transporting or conveying materials or cargo, exist with, or may be adapted to include integrated and on-board weighing capability, allowing for the measurement of a payload that is carried or transferred thereby. Such vehicles include single vehicles and tractor-trailer combinations. An example of a single vehicle may include a dump truck, a combine, or a self-propelled feed mixer, and the like. An example of a tractor-trailer combination may include a tractor pulling a grain cart, a seed tender, a feed mixer, a manure spreader, a semi-truck with semi-trailer, and the like. Many of these vehicles have a mechanically-powered discharge mechanism, such as hoist in the case of a dump truck, or an auger or a conveyer in the case of a grain cart, a seed tender, a feed mixer, or a manure spreader.

Often, devices designed or adapted to determine the operational state of a vehicle or a machine, particularly third-party devices, such as after-market devices, may not have a ready, direct and/or cost-effective access to the operational state of the vehicle. For example, the devices cannot be readily and/or cost effectively connected with the control systems of the vehicle or the machine to determine the state of those control systems and to determine the operational state therefrom. It may be further difficult due to technical, mechanical and/or cost issues, to affix sensors to various mechanical portions of the vehicle or the machine to detect the state of operation. The various mechanical portions may include the engine, the power take off shaft, the wheels, and the like. For example, it may be expensive, inconvenient or impossible to connect an aftermarket device to the control systems or otherwise to affix sensors to the mechanical portions of the vehicle or the machine after manufacture thereof. The difficulty in connecting an aftermarket device to the control systems of a machine may be due to the lack of an interface or to restrictions of the use thereof, design, impediments to running additional wiring, and the like.

Furthermore, it may be inconvenient, or unreliable, to require the operator of the machine to manually determine the state of operation or otherwise actuate a separate control mechanism for doing so.

BRIEF DESCRIPTION OF THE DRAWINGS

The above and other objects, features and advantages of the present disclosure should be more apparent from the following detailed description taken in conjunction with the accompanying drawings.

DETAILED DESCRIPTION

Figure 1:
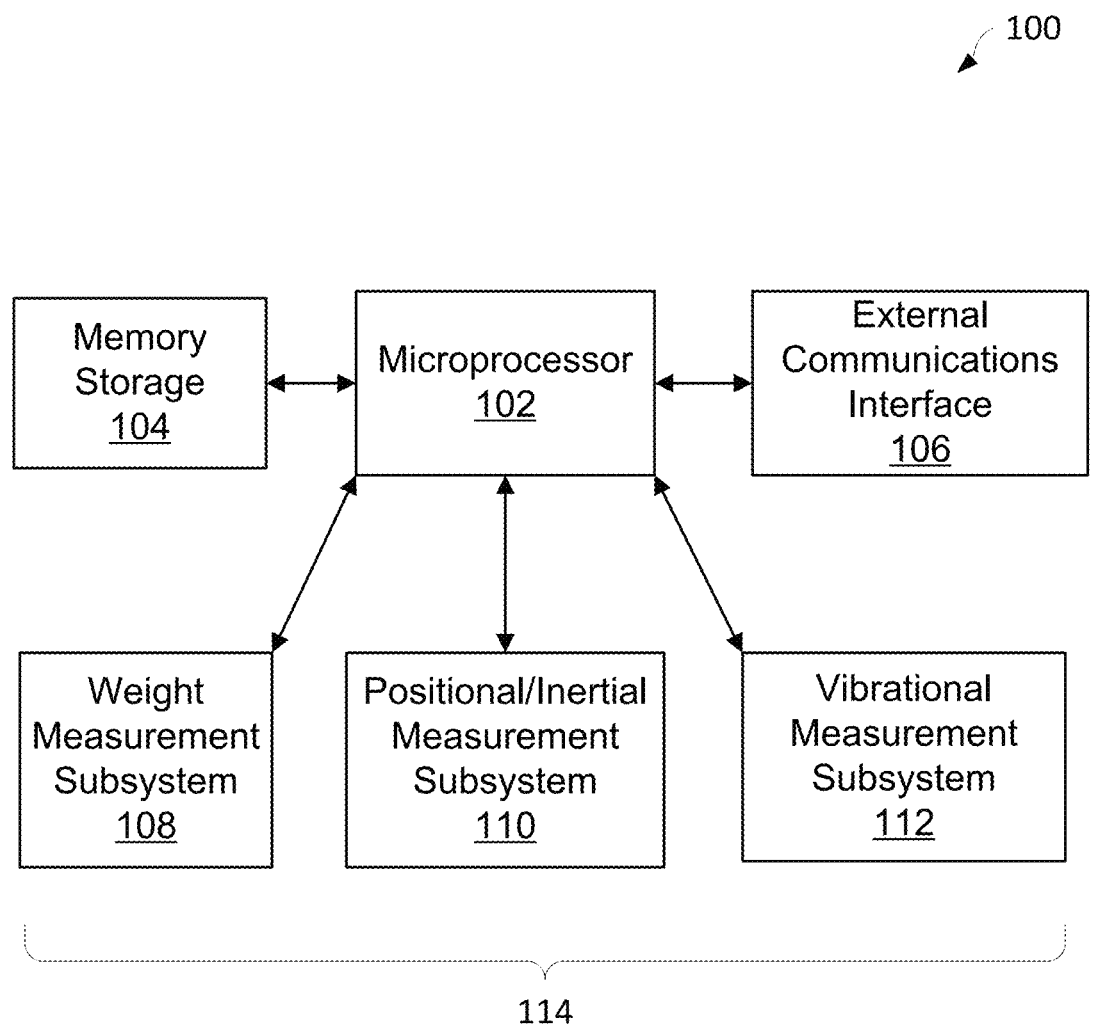
FIG. 1 is a block diagram of a system for detecting and recording the operational state of a machine, in accordance with an embodiment of the present disclosure.

Aspects of the present disclosure overcome at least the problems and limitations of the prior art by providing an apparatus, a system, and a method that can indirectly detect and determine the operational state of the vehicle or the machine in a reliable and automatic fashion.

The apparatus, the system and the method may automatically collect data regarding the current, prior or future operational state of the vehicles or the machines for different purposes. The different purposes may include better business management, regulatory compliance, and the like. The machines may include farm vehicles. The operational state may include whether a vehicle or a machine is stationary, moving or travelling, preparing to transfer or transferring material, or loading or unloading. The current, prior or future operational state, or change/transition therebetween, may be used to calculate various metrics as will be described. It will be appreciated that these operational states may be referred to by other terminology and the vehicle or machine may implement fewer or more operational states or sub-states depending upon the implementation. The calculated metrics may include one or more of stationary time, travelling time, travelled distance, path or route travelled, average speed, the amount of material transported or transferred, maintenance intervals, utilization, and the like, or combinations thereof. Additionally, it may be desirable to determine the source and destination of the material transfers.

A detailed description of several embodiments of the present disclosure is given below. It is to be understood, however, that the disclosure is not to be construed as being limited to these embodiments.

The disclosed embodiments provide methods and techniques for operational state detection and related data management functionality. In particular, the disclosed embodiments relate to an apparatus, a system and a method of indirectly determining, in other words, without at least a direct connection with the control systems of the vehicle or the machine, a state of operation of the machine or the vehicle.

The disclosed apparatus, system and method differ from solutions offered by others since it is not integrated with the control systems of the machine. The control systems of the machine may comprise one or multiple electronic control units (ECU) that control the electrical system or subsystems in the machine as well as mechanical, electronic, or electro-mechanical actuators which are used to control the operations of the machine or subsystems thereof via an ECU or otherwise. The subsystems in the machine may include mechanical systems of the machine, i.e., the engine, the drive shaft, the power take off shaft, the wheels, and the like. Instead, the disclosed apparatus, system and method may be suited to be implemented as an accessory or other device added or otherwise affixed to the machine, such as during or after the manufacture thereof. It will be appreciated that, while in some embodiments, the disclosed device may draw operating power from the machine or a component thereof, the disclosed embodiments are not otherwise coupled with control systems so as to be able to detect actuation or the result of actuation thereof.

Various sensors may be used on the machine to detect forces imparted on the machine to determine and record an operational state of the machine. The operational state of the machine may include, but is not limited to, whether a machine is stationary, travelling, or transferring (loading/unloading) material. Where the vehicle is a tractor-trailer combination, the sensors may be located on the tractor, trailer, or both.

A change in the determined operational state may be used to trigger, or otherwise start and stop, other functions such as electronic recording of a current operating characteristic of the machine. Operating characteristics of the machine may include the current weight, or change over time thereof, of the machine and/or its payload, which may be further recorded along with a timestamp, and/or other metadata, temporal, geographic or otherwise. The metadata may include an identity of the operator, geographic location(s), route(s), orientation(s), direction(s) of travel, speed(s), altitude(s), environmental conditions, i.e., temperature, humidity, ambient light, and the like.

A change in the operational state may be used to detect and record the amount of material transported, loaded and/or transferred to or from the machine.

A change in the operational state may be used to detect and record the amount of time spent in each operational state.

Additionally, the disclosed embodiments may be adapted for use with other machines which do or do not feature on-board weighing capability.

Various embodiments of the present disclosure may include techniques to directly and/or indirectly detect and/or assist with machine operational state detection as described below, including, but not limited to, whether the machine is idle, travelling, or transferring material. The detection of these states, and the transitions between them, can be used to initiate and/or control the collection of additional information. The additional information may include the amount of material transferred, operational, environmental or other conditions occurring during each state or at a transition therebetween, and/or the amount of time spent in each state.

FIG. 1 depicts a block diagram of a system 100 for indirectly determining, without at least a direct connection with the control systems of a vehicle, a state of operation of a vehicle according with an embodiment. As shown in FIG. 1, the system 100 includes a processor 102 coupled with a memory 104, an external communications interface 106, and one or more of a plurality of measurement subsystems 114. The processor 102 may be a suitably programmed, e.g. via executable instructions stored in the memory 104, general purpose processor or a specifically configured processor such as an FPGA or ASIC. The one or more of the plurality of measurement subsystems may include a weight measurement subsystem 108, a position and inertial measurement subsystem 110 and/or a vibrational measurement subsystem 112. Generally, each of the one or more of the plurality of measurement subsystems 114 may comprise one or more sensors, transceivers or the like to sense or otherwise measure one or more physical or environmental, e.g. analog, parameters or receive/detect external signals, e.g. positional signals such as GPS transmission, which may change depending upon the operation of the machine and generate or otherwise derive "measured" data indicative thereof as described. The operation of each of these components is described below. It should be appreciated that, in other embodiments as explained below, not all of the depicted components may be included.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

Figure 2:
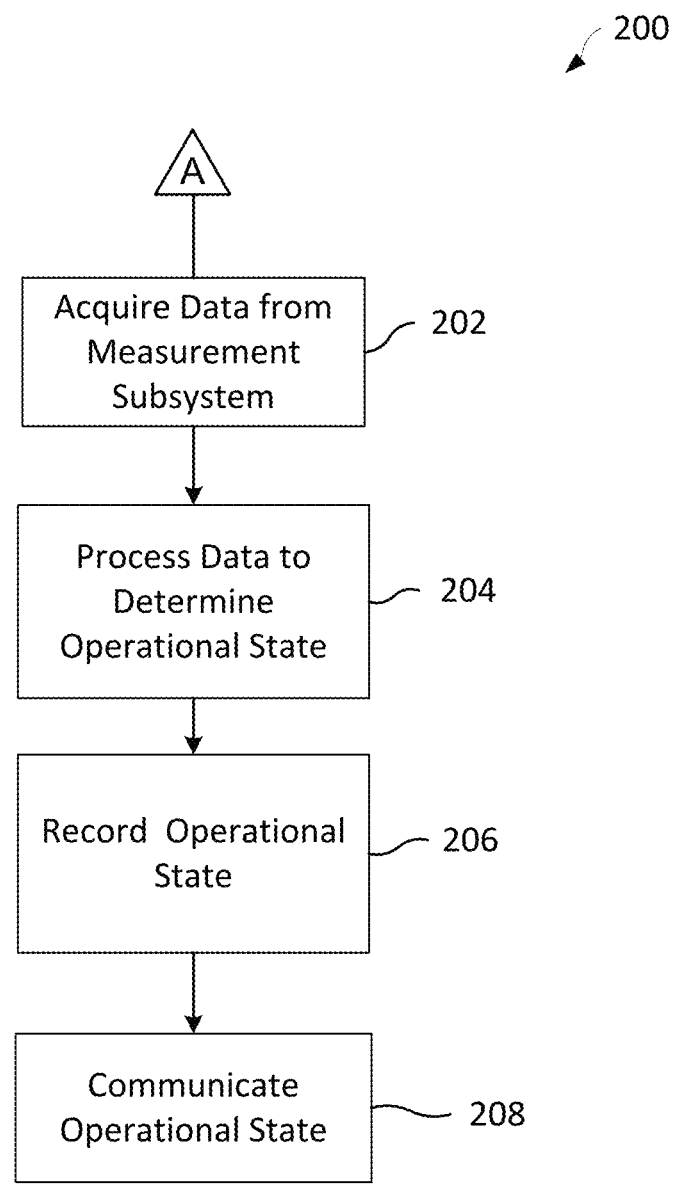
FIG. 2 is a flowchart that illustrates a method for determining the operational state of a vehicle, in accordance with an embodiment of the present disclosure.

A flowchart for the method and apparatus for determining the operational state of a vehicle described herein is shown in FIG. 2. In one embodiment, a computer executable program code stored in the memory 104 is executed by the processor 102 to cause the processor 102 to interact with one or more of the plurality of measurement subsystems 114. At block 202, the processor 102 acquires data from one or more of the plurality of measurement subsystems 114. At block 204, the processor 102 processes the data to determine operational state of the vehicle, At block 206, the processor 102 records the determined operational state and associated data in the memory 104 or other electronic storage device coupled with the system (not shown). At block 208, the processor communicates the determined operational state and other information via the communications interface 106, which may include a wired and/or wireless interface such as Wi-Fi, Bluetooth, cellular, etc., to a receiver. The receiver may include a computer, a mobile device, such as a smartphone or tablet, or a remote server connected via a wired and/or wireless public and/or private communications network, such as the Internet, and the like. Wired and/or wireless Internet communication may be supported via an internal or external Internet gateway or modem.

In one embodiment, the data measured by positional/inertial measurement subsystem 110 of the one or more plurality of measurement subsystems 114 is indicative, alone or in combination with the data measured by one or more of the other measurement subsystems 114, of a measurement of the positional and inertial characteristics of the machine. In this embodiment, the measurement of the positional/inertial characteristics of the machine may be used to detect and determine or otherwise infer or derive the operational state of the machine. The positional/inertial characteristics of the machine may be detected using, for example, one or more position measurement subsystems, i.e., global navigation satellite system (GNSS)/GPS, trilateration, ultrasonic tracking, Wi-Fi positioning, and the like. The positional/inertial characteristics of the machine may also be detected by using one or more inertial measurements or dead reckoning measurement subsystems, i.e., accelerometer, gyroscope, magnetometer, or load cell, inertial navigation system (INS) and the like.

In one embodiment, the operational mode of a machine may be determined based on the mode of travel that the machine is undertaking. Some of these modes include stopping, travelling slowly, steadily, and straight, travelling fast and/or varying speed and/or bearing, arriving at a particular transfer location, and departing a particular transfer location.

Figure 3:
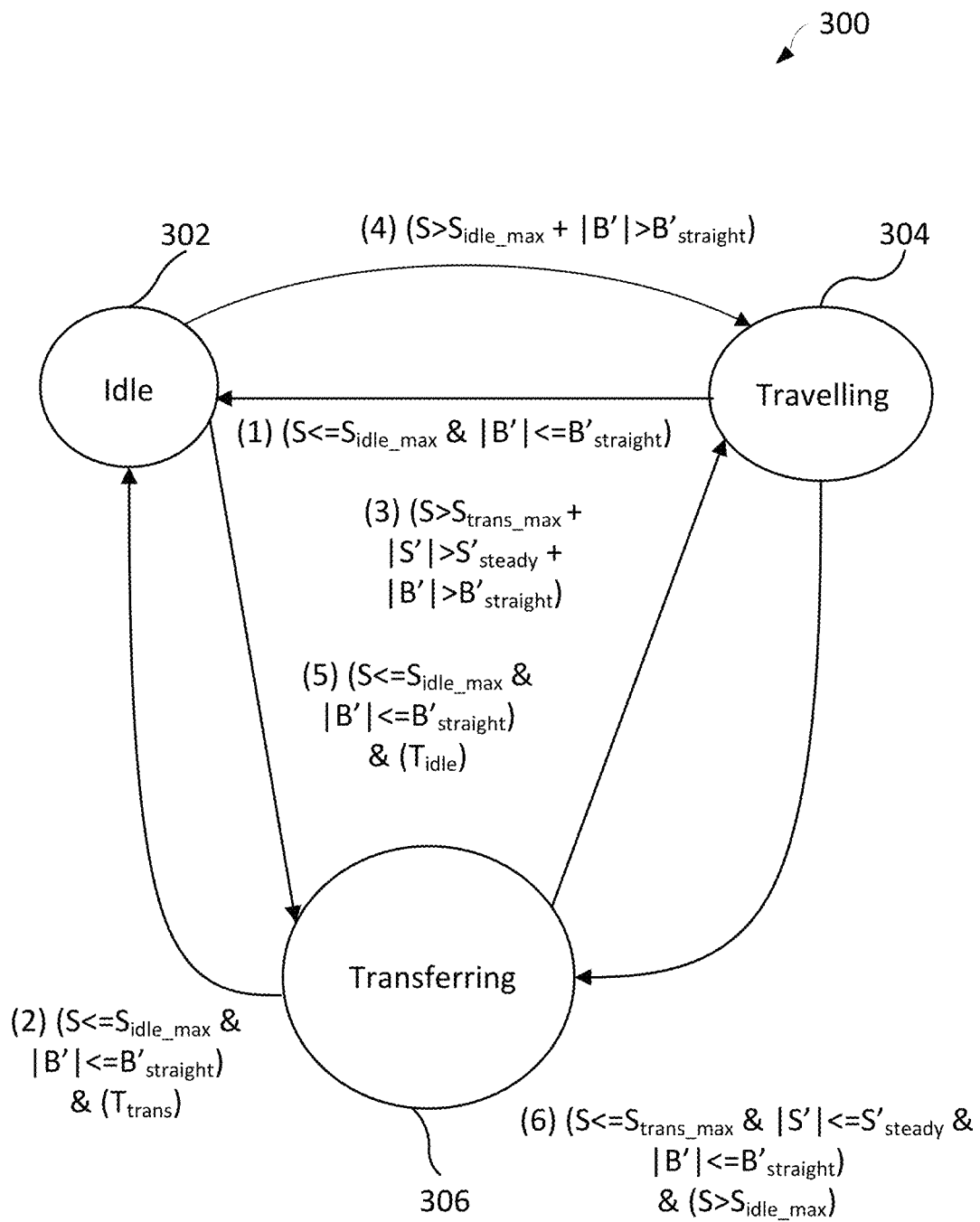
FIG. 3 is a state diagram that illustrates a state machine model that shows the transition between states when using positional and/or inertial information, in accordance with an embodiment of the present disclosure.

FIG. 3 illustrates a position-based state machine 300 which may be implemented by the processor 102, as described below, for operational modes, showing states, state transitions, and transition trigger criteria. The disclosed embodiments may rely upon a property of the operational states of the machine. The operational states of the machine may include an idle state 302, a travelling state 304, and a transferring state 306. In this embodiment, the speed and bearing behavior is distinct for each of the three states if transferring occurs while in motion. Transferring when stationary cannot be distinguished from idle without additional information.

FIG. 3 illustrates various expressions which may be implemented by the processor 102, such as by computer executable instructions stored in the memory 104 and executable by the processor 102 and evaluated thereby based on the data indicative of a particular measured characteristic received from one or more of the measurement subsystems 114 to determine the state transition trigger criteria that is position-based, the resultant state indicative of the current operational state of the machine. In the expressions shown in FIG. 3 and explained below: S is the machine speed; B is the machine bearing; $S_{trans\_max}$ is the maximum machine speed while transferring; $S_{idle\_max}$ is the maximum machine speed while idle; $T_{idle}$ is the idle time-out; $T_{trans}$ is the transferring timeout; $S'_{steady}$ is the max rate of change of machine speed for steady operation; $B'_{straight}$ is the max rate of change of machine bearing for a straight operation; X' is the rate of change of parameter X; |X'| is the magnitude of parameter X'; & is the Logical AND; and + is the Logical OR. Machine speed S and bearing B may be determined by the positional/inertial measurement subsystem 110 based on, for example, a change or rate of change of a GPS, dead reckoning, etc. determined position, compass heading, or the like. An internal clock, GPS, or other timing device may be used to generate, measure or derive T.

In the idle state 302, the machine is at rest, neither transporting nor transferring material. In one embodiment, the machine is determined to exit its current state and enters the idle state 302 when it becomes stationary. For example, Expression (1) shown below, represents the transition trigger criteria used to determine that the machine exits the travelling state 304 and enters the idle state 302 when the location and bearing of the machine remain constant. Further, Expression (2) shown below, represents the transition trigger criteria used to determine that the machine exits the transferring state 306 and enters the idle state 302 after a timeout when transferring material and already stationary.

$$S<=S_{idle\_max} \ \& \ |B'|<=B'_{straight} \tag{1}$$

$$(S<=S_{idle\_max} \ \& \ |B'|<=B'_{straight}) \ \& \ (T_{trans}) \tag{2}$$

In the travelling state 304, the machine is moving between geographic locations, either under its own power or via another machine, along with any material it may be carrying between transferring (loading or unloading), or rest locations. In one embodiment, the machine is determined to exit its current state and enter the travelling state 304 when its speed or velocity or the rates of change of speed or velocity or bearing exceeds known maximum values experienced while transferring, as shown in Expression (3) below, or idle, as shown in Expression (4) below:

$$S>S_{trans\_max}+|S'|>S'_{ready}+|B'|>B'_{straight} \tag{3}$$

$$S>S_{idle\_max}+|B'|>B'_{straight} \tag{4}$$

Alternatively, or in addition thereto, the machine may be determined to have exited the transferring state and entered the travelling state 304 when it has departed a particular known loading or unloading location using geo-fencing or similar techniques. Loading or unloading locations may include a field, a depot, a storage facility, a location of another vehicle, and the like.

In the transferring state 306, the machine may be transferring, i.e., loading or unloading, or preparing to transfer material either into or out of its storage carrier. It can be appreciated that the machine may include an integrated mechanism for loading or unloading, such as a conveyor or auger, or may be loaded or unloaded by a separate machine, i.e., a conveyor, an auger, and the like. In one embodiment, as shown in Expression (5) below, the machine is determined to exit the idle state 302 and enter the transferring state 306 after an elapse of a specified time (the idle timeout) while remaining stationary. Further, as shown in Expression (6) below, the machine exits the travelling state 304 and enters the transferring state 306 when it begins to maintain a slow, mainly-constant non-zero speed with a mainly-constant bearing. The use of time-outs is not ideal as it relies on expected behavior and not on sensed inputs. Consequently, it may result in degraded system performance.

$$(S<=S_{idle\_max} \ \& \ |B'|<=B_{straight}) \ \& \ (T_{idle}) \qquad (5)$$

$$(S<=S_{trans\_max} \ \& \ |S'|<=S'_{steady} \ \& \ |B'|<=B'_{straight}) \ \& \\ (S>S_{idle\_max}) \qquad (6)$$

Alternatively, or in addition thereto, the machine may be determined to have exited the travelling state 304 and entered the transferring state 306 when it has arrived at a particular known loading or unloading location using geofencing or similar techniques. The location may include a field, a depot, a storage facility, a location of another vehicle, and the like.

When the machine arrives at a transfer location, the machine typically either comes to a stop or travels at a slow, mainly-constant speed and mainly-constant heading. For instance, if the machine is travelling to a fixed and concentrated unloading location, such as a stationary truck or elevator pit, the machine may stop before initiating the unload operation, and may then unload while remaining primarily stationary. If the machine is traveling to a fixed but distributed unload location such as a grain bag or feed bunk, the machine may stop before initiating the unload operation, and may then unload while travelling slowly at a constant heading and bearing to unload evenly over the destination. If the machine is travelling to a fixed and concentrated loading location, such as a stationary or stopped unloading machine, the machine may stop in order to receive the material. If the machine is traveling to a mobile but concentrated source of material to load, such as the case of a combine actively harvesting, the machine may adjust its speed, bearing, and proximity to coordinate its motion with the unloading machine resulting in a slow mainly-constant speed and mainly-constant heading while loading the material. Note the heading may change based on the direction of travel of the unloading machine, but changes in heading will likely be relatively gradual. When completed, the machine departs a transfer location, adjusting its speed and bearing according to the new location to which the machine is travelling, typically at higher speeds to reduce operational time. In an alternative embodiment where the machine arrives at a location of a known vehicle, also in motion, to transfer material to or receive material from the known vehicle, the machine's matching of speed and heading to that of the known machine may be indicative of a loading or unloading operation, regardless of the magnitude of the speed of travel.

In another embodiment, a measurement of the vibration characteristics, i.e., rapid opposing or periodic movement of the machine, or a portion thereof, may be used to detect and determine the operational state of the machine. The vibration may be detected through the use of a plurality of sensors. The sensors may include, for example, one or more accelerometers, load cells, piezoelectric sensors, gyroscopes, or other sensors which detect forces imparted on the machine, or any combination thereof. The disclosed embodiments may rely upon a property of the machine that when idle, little vibration is present, that when travelling, most of the vibration is oriented vertically relative to the machine or orientation thereof, and that when the machine is transferring, the vibration occurs in other orientations or modes instead of or in addition to the vertical orientation or mode, relative to the machine or orientation thereof.

In one embodiment, the data generated by the vibrational measurement subsystem 112 of the one or more plurality of measurement subsystems 114 is indicative, alone or in combination with the data generated by one or more of the other measurement subsystems 114, of a measurement of the vibrational characteristics of the machine. In this embodiment, the operational mode of the machine may be determined based on the mode of vibration that the machine is undergoing. The modes of vibration which exist in the machine, relative to the machine, are, alone or in combination, vertical (up and down), horizontal (side-to-side and/or front-to-back), rotational (oscillating about one or more axes in the three-dimensional space), or eccentric (vibration in a circular or elliptical fashion, while maintaining a constant orientation).

Figure 4:
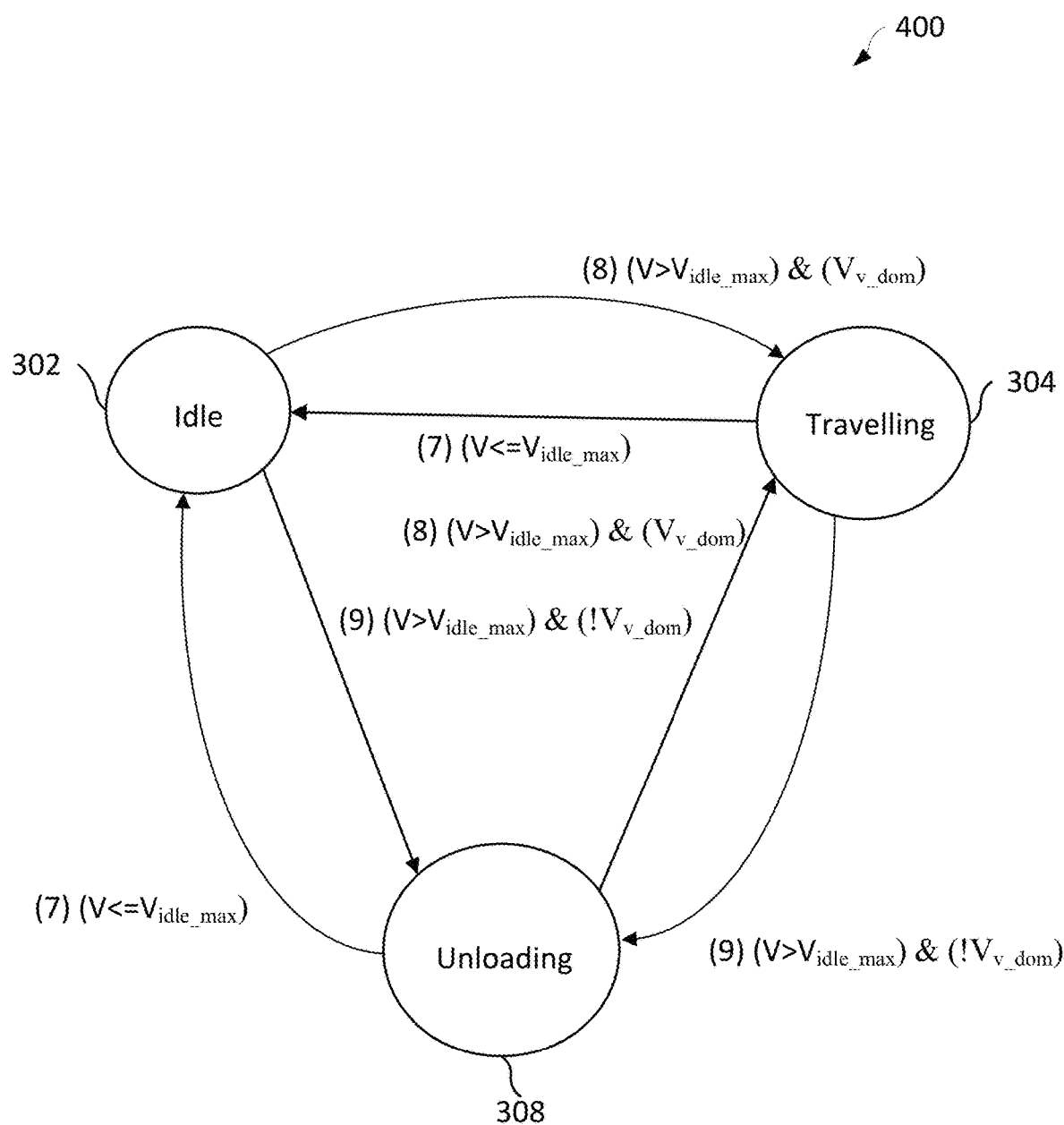
FIG. 4 is a state diagram that illustrates a state machine model that shows the transition between states when using vibrational information, in accordance with an embodiment of the present disclosure.

FIG. 4 illustrates a vibration-based state machine 400 which may be implemented by the processor 102 for operational modes, showing states, state transitions, and transition trigger criteria. In this embodiment, the operational modes of the machine may include an idle state 302, a travelling state 304, and an unloading state 308. The unloading state 308 is a subset of the transferring state. The disclosed embodiments may rely upon a property of the operational states of the machine in which vibrational behavior is distinct for each of the three states.

Vibration orientation of the machine may include vertical orientation, horizontal orientation, rotational orientation and/or eccentric orientation. A vibrational characteristic of the machine may include one or more of a vibration intensity of the machine and/or a vibration orientation of the machine. Vibration may be measured through the use of a plurality of sensors, affixed to or otherwise coupled with the machine. The sensors are responsive to acceleration or forces. The sensors may include load cells, accelerometers, piezoelectric sensors, acoustic sensors, or any other sensor adapted to respond to force imparted on the machine such as vibration. The sensors may be responsive to vibrations in one or more modes. In one embodiment, the sensors include one or more load cells and/or accelerometers. It can be appreciated that other types of sensors, now available or later developed, may be used in lieu of, or in addition to, load cells or accelerometers. The sensors may be implemented as an analog and/or digital, micro-mechanical device and/or integrated circuit and may generate an analog or digital signal indicative of the sensed force and/or digital data representative thereof. The plurality of sensors may include a first sensor, a second sensor, a third sensor and a fourth sensor to detect different types of vibrations.

Vertical vibration (relative to the machine) may be detected through the use of the first sensor. The first sensor is responsive to vibration in the vertical direction. The first sensor may be one or more load cells, adapted to respond to the weight, or change thereof, of the machine, its payload container and/or the contents thereof. Vertical vibration may result in a time-variation in the weight measured over a period of time. The first sensor may also be a one-dimensional, two-dimensional, or three-dimensional accelerometer oriented to be responsive to vertical vibration. Other sensors, such as piezoelectric sensors may also be used. The disclosure is not limited to the sensors described.

Horizontal vibration (relative to the machine) may be detected through the use of the second sensor. The second sensor is responsive to horizontal vibration. The second sensor may be one or more compression or tension sensitive load cells adapted to respond to the horizontal vibration of the machine. The second sensor may also be a one-dimensional, two-dimensional, or three-dimensional accelerometer oriented to be responsive to vibration in the horizontal direction. Other sensors, such as piezoelectric sensors may also be used. The disclosure is not limited to the sensors described.

Rotational vibration (relative to the machine) may be detected through the use of the third sensor responsive to rotational vibration. The third sensor may be one or more load cells, adapted to respond to rotational vibration of the machine. The third sensor may also be a one-dimensional, two-dimensional, or three-dimensional accelerometer oriented to be responsive to rotational vibration. The third sensor may also be a gyroscope, orientated to be responsive to rotational vibration. Other sensors, such as piezoelectric sensors may also be used, and the disclosure is not limited to the sensors described. Rotational vibration can be detected indirectly using a multi-dimensional accelerometer responsive to vibration in a rectangular coordinate system and processing the output signals.

Eccentric vibration (relative to the machine) may be detected through the use of the fourth sensor responsive to eccentric vibration. The fourth sensor may be one or more load cells, adapted to respond to eccentric vibration of the machine. The fourth sensor may also be a one-dimensional, two-dimensional, or three-dimensional accelerometer oriented to be responsive to eccentric vibration. The fourth sensor may also be a gyroscope, orientated to be responsive to eccentric vibration. Other sensors, such as piezoelectric sensors may also be used, and the disclosure is not limited to the sensors described. Eccentric vibration can be detected indirectly using a multi-dimensional accelerometer responsive to vibration in a rectangular coordinate system and processing the output signals.

It can be appreciated that one or more of the sensors described above may be capable of detecting one or more of the different types of vibration. In addition, these, or additional sensors, may be used to determine the orientation of the vehicle with respect to a reference, such as gravity, to determine whether the vehicle is climbing or descending an incline, tilted or canted due to uneven terrain, and the like.

The sensors sense, continuously or otherwise, physical forces and may generate a signal, analog or digital, representative thereof. The sensors may be coupled with a processor which continuously or periodically receives, through digital communications or by sampling and converting an analog signal to digital form, the generated signals from the sensors. The processor is operative to receive the samples such that the vibration detected by the sensor may be quantified to simplify the decision-making process, through the use of such techniques as standard deviation, standard deviation from a polynomial fit, or other noise power methods, or combinations thereof, such that the processor may determine one or more values representative of the sensed vibration which may then be used to compare against pre-defined values indicative of the various operational states as is described below. The variation may also be detected in the frequency domain, through the use of digital filters or spectral analysis such as the Fast Fourier Transform (FFT). The quantification allows the processor to determine whether a particular vibrational mode exists. Other mathematical techniques, e.g. vector analysis, can reveal rotational or eccentric vibrational modes in signals derived from sensors responsive to only rectangular coordinate, e.g. horizontal and/or vertical, directions. A method involves detecting the rotational vibration mode, e.g. magnitude and direction, in signals dominated by a single vibrational frequency by computing the cross-product of successive multi-dimensional rectangular vibration vectors. Other methods may also be used to reveal modes of one kind in signals from sensors responsive to other modes, and the disclosure is not limited to the methods described.

FIG. 4 illustrates various expressions which may be implemented by the processor 102, such as by computer executable instructions stored in the memory 104 and executable by the processor 102 and evaluated thereby based on the data indicative of a particular measured characteristic received from one or more of the measurement subsystems 114 to determine the transition trigger criteria that is vibration-based. In the expressions shown in FIG. 4 and explained below: V is the vibration (all modes); $V_{v\_dom}$ represents that the vertical vibrational mode is dominant; $V_{idle\_max}$ is the maximum vibration when idle; & is the Logical AND; and + is the Logical OR. Vibration V may be determined by the vibrational measurement subsystem 112 based on, for example, a measurable acceleration experienced by an accelerometer or a digital signal generated by a load cell in response to a force.

Referring to FIG. 4, in the idle state 302, the machine is at rest, neither transporting nor transferring material. In an embodiment, the machine exits its current state and enters the idle state 302 when the vibration detected becomes minimal in all modes, limited by the noise of the measurement sensor(s). Expression (7) shows the transition trigger criteria used to determine that the machine exits the unloading state 308 or the travelling state 304 and enters the idle state 302.

$$V<=V_{idle\_max} \qquad (7)$$

In the travelling state 304, the machine is moving between geographic locations, either under its own power or via another vehicle, along with any material it may be carrying between loading, unloading, or rest locations, or may be in the process of being loaded whether the machine is stationary or in-motion. The machine exits its current state and enters the travelling state when vibration is present and is dominated by the vertical mode, relative to the machine, as the vibration is caused by travelling over vertical deviations in the ground surface or by loading material into the machine's storage carrier. Expression (8) shows the transition trigger criteria used to determine that the machine exits the unloading 308 state or the idle state 302 and enters the travelling state 304.

$$(V>V_{idle\_max}) \;\&\; (V_{v\_dom}) \qquad (8)$$

Traversing different terrain with each wheel causes some non-vertical vibrational modes due to side-to-side rocking of the vehicle. Similarly, cornering causes non-vertical vibrational modes due to the centrifugal effect. Filter techniques can be used to reject some anomalies; however, system performance issues may persist.

In the unloading state 308, the machine may be transferring or preparing to transfer material with an integrated conveying mechanism out of its storage carrier. In an embodiment, the machine exits its current state and enters the unloading state when vibration is present, and the vertical vibrational modes no longer dominate. Expression (9) shows the transition trigger criteria used to determine that the machine exits the travelling state 304 or the idle state 302 and enters the unloading state 308.

$$(V>V_{idle\_max}) \;\&\; (!V_{v\_dom}) \qquad (9)$$

In the unloading state 308, the vibration imparted by operation of the transfer mechanism, i.e., an auger, a conveyor or a pump, is restricted or damped in the vertical direction (relative to the machine) as the ground impedes movement in this direction. Therefore, the vertical vibration is minimal. Whereas, due to the rotational nature of the operation of the transfer mechanism, horizontal, rotational and/or eccentric vibration are present, alone or in combination. When unloading material while the vehicle is in motion, all modes may be present in significant amounts due to the combination of vehicle travel (primarily vertical vibrational mode) and operation of the transfer mechanism (primarily non-vertical vibrational modes). Additionally, when the vehicle is a tractor-trailer combination, where the tractor and trailer are loosely mechanically coupled, such as when using a hitch clevis and drawbar, the vibration of the tractor as experienced by the trailer, such as vibration caused by the engine, is small when stopped, even while preparing to unload or unloading.

In another embodiment for use with machines that do not feature an integrated conveying mechanism, i.e., machines which rely on gravity for unloading to a non-integrated conveying mechanism, a measurement of the weight or volume, or change therein, of material carried by the machine may be used to detect and determine the operational state of the machine. The weight and/or volume may be detected through the use of, for example, one or more load cells, piezoelectric sensors, pressure transducers, 3D volumetric camera or other sensors which detect forces imparted on the machine by the weight of the material carried thereby, or any combination thereof.

In one embodiment, the data measured by the weight measurement subsystem 108 of the one or more plurality of measurement subsystems 114 is indicative, alone or in combination with the data measured by one or more of the other measurement subsystems 114, of a measurement of the weight characteristics of the machine, or a change thereof over time. In this embodiment, the machine's operational mode may be determined based on the mode of weight behavior that the machine is undergoing over a continuous and/or discontinuous period of time. The modes of weight behavior for the machine may include stable weight, increasing weight, decreasing weight, and variable weight.

Figure 5:
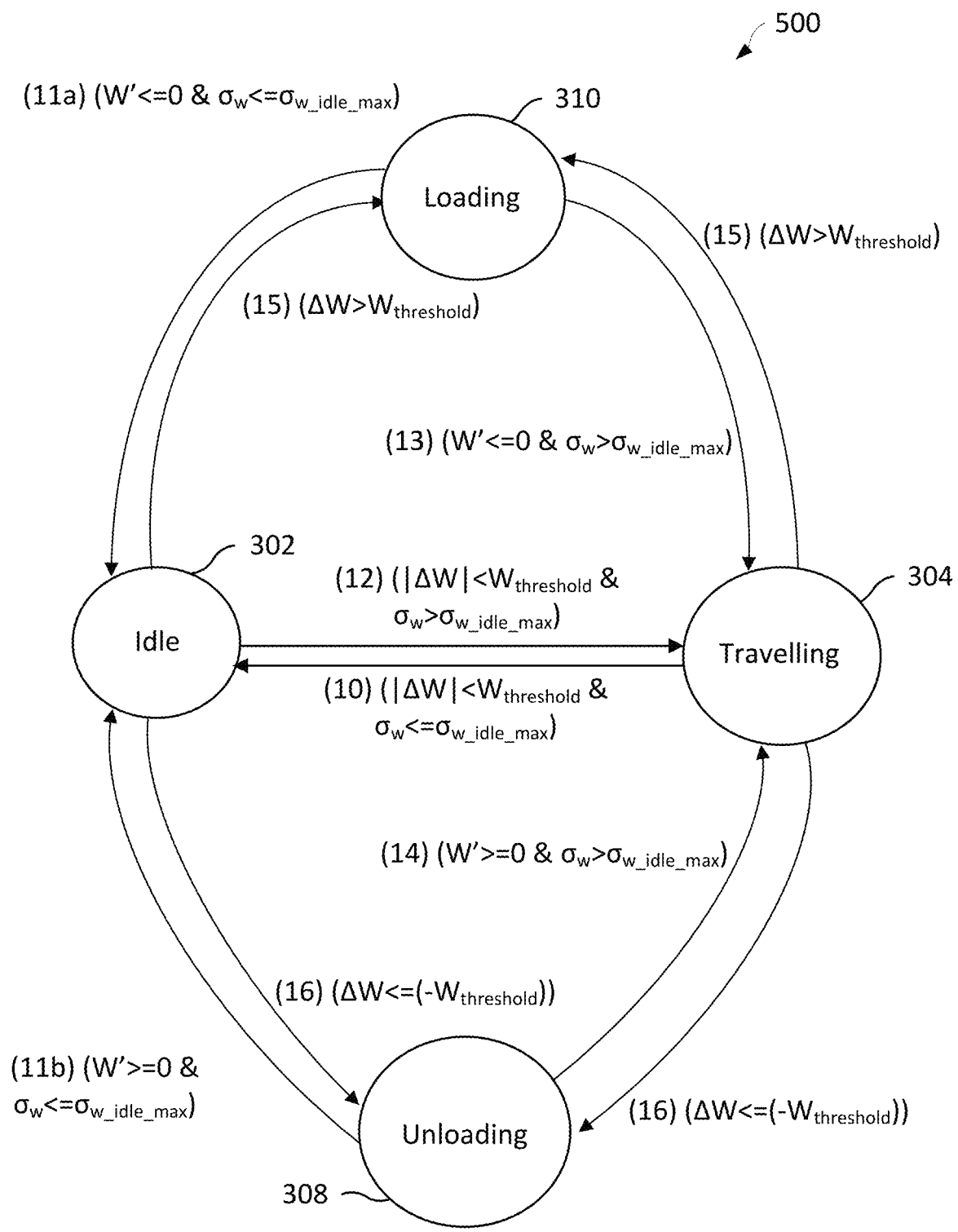
FIG. 5 is a state diagram that illustrates a state machine model that shows the transition between states when using weight information, in accordance with an embodiment of the present disclosure.

FIG. 5 illustrates a weight-based state machine 500 which may be implemented by the processor 102 for operational modes, showing states, state transitions, and transition trigger criteria. In this embodiment, the machine operational states may include an idle state 302, a travelling state 304, an unloading state 308, and a loading state 310. The loading state 310 and the unloading state 308 are derived from the transferring state 306. The disclosed embodiments may rely upon a property of the operational states of the machine in which the weight behavior is distinct for each of the four operational states.

FIG. 5 illustrates various expressions which may be implemented by the processor 102, such as by computer executable instructions stored in the memory 104 and executable by the processor 102 and evaluated thereby based on the data indicative of a particular measured characteristic received from one or more of the measurement subsystems 114 to determine the transition trigger criteria that is weight-based. In the expressions shown in FIG. 5 and explained below: W is the payload weight; $\sigma_w$ is the standard deviation of parameter W; $Y_{w\_idle\_max}$ is the max weight variability while idle; $W_{threshold}$ is the threshold of significant weight change; $\Delta W$ is the difference of values of parameter W measured at different times; X' is the rate of change of parameter X; |X| is the magnitude of parameter X; and & is the Logical AND. Weight W may be determined by the weight measurement subsystem 108 based on, for example, a change in voltage output of a load cell, a piezoelectric sensor, or a pressure transducer, e.g. coupled with the material container of the machine, as a response to a force applied.

In the idle state 302, the machine is at rest, neither transporting nor transferring material. In one embodiment, the machine exits the travelling state 304 and enters the idle state 302 when the weight signal variability (deterministic or random) becomes reduced and the weight neither rises nor falls. Expression (10) shown below represents the transition trigger criteria used to determine that the machine exits the travelling state 304 and enters to the idle state 302. Alternatively, or in addition thereto, the machine exits the loading state 310 and enters the idle state 302 when the weight signal stops rising and may begin to fall, and when the weight signal variability (deterministic or random) becomes reduced. Expression (11a) shown below represents the transition trigger criteria used to determine that the machine exits the loading state 310 and enters the idle state 302. Alternatively, or in addition thereto, the machine exits the unloading state 308 and enters the idle state 302 when the weight signal stops falling and may begin to rise, and when the weight signal variability (deterministic or random) becomes reduced. In some cases, due to issues such as mechanical binding, the measured weight after loading or unloading may not reach the actual weight immediately after loading or unloading. In these cases, it may be advantageous to use a weight measurement measured subsequent to the machine having moved some distance which, for example, may free any bound components. Such a deferred measurement can be achieved, for example, by waiting for an increase in the variability in the weight due to travelling or waiting for the weight to change in a direction opposite to the direction of the weight change that occurred during the transfer. The system may remain in the loading or unloading state until one of these conditions occur. Expression (11b) represents the transition trigger criteria used to determine that the machine exits the unloading state 308 and enters the idle state 302.

$$(|\Delta W| < W_{threshold}\ \&\ \sigma_w <= \sigma_{w\_idle\_max}) \tag{10}$$

$$(W' <= 0\ \&\ \sigma_w <= \sigma_{w\_idle\_max}) \tag{11a}$$

$$(W' >= 0\ \&\ \sigma_w <= \sigma_{w\_idle\_max}) \tag{11b}$$

In the travelling state 304, the machine is moving between geographic locations, either under its own power or via another vehicle, along with any material it may be carrying between loading, unloading, or rest locations. In one embodiment, the machine exits the idle state 302 and enters the travelling state 304 when the weight signal variability (deterministic or random) becomes increased and the weight neither rises nor falls. Expression (12) shown below represents the transition trigger criteria used to determine that the machine exits the idle state 302 and enters the travelling state 304. Alternatively, or in addition thereto, the machine exits the loading state 310 and enters the travelling state 304 when the weight signal stops rising and may begin to fall, and when the weight signal variability (deterministic or random) becomes increased due to travel over uneven terrain if not already so. Expression (13) shown below represents the transition trigger criteria used to determine that the machine exits the loading state 310 and enters the travelling state 304. Alternatively, or in addition thereto, the machine exits the unloading state 308 and enters the travelling state 304 when the weight signal stops falling and may begin to rise, and when the weight signal variability (deterministic or random) becomes increased due to travel over uneven terrain if not already so. Expression (14) shown below represents the transition trigger criteria used to determine that the machine exits the unloading state 308 and enters the travelling state 304.

$$(|\Delta W| < W_{threshold} \,\&\, \sigma_w > \sigma_{w\_idle\_max}) \quad (12)$$

$$(W' <= 0 \,\&\, \sigma_w > \sigma_{w\_idle\_max}) \quad (13)$$

$$(W' >= 0 \,\&\, \sigma_w > \sigma_{w\_idle\_max}) \quad (14)$$

In the loading state 310, the machine may be transferring or preparing to transfer material with or without an integrated conveying mechanism into its storage carrier. In an embodiment, the machine exits its current state and enters the loading state 310 when the weight begins to increase due to the loading of material into the machine's storage carrier. Expression (15) shown below represents the transition trigger criteria used to determine that the machine exits the idle state 302 or the travelling state 304 and enters the loading state 310.

$$(\Delta W > W_{threshold}) \quad (15)$$

In the unloading state 308, the machine may be transferring or preparing to transfer material with an integrated conveying mechanism out of its storage carrier. In an embodiment, the machine exits its current state and enters the unloading state 308 when the weight begins to decrease due to the unloading of material from the machine's storage carrier. Expression (16) shown below represents the transition trigger criteria used to determine that the machine exits the idle state 302 or the travelling state 304 and enters the unloading state 308.

$$(\Delta W <= (-W_{threshold})) \quad (16)$$

In one embodiment, the data measured by the positional/inertial measurement subsystem 110 of the one or more plurality of measurement subsystems 114 is indicative, alone or in combination with the data measured by the vibrational measurement subsystem 112 of the other measurement subsystems 114, of a measurement of a combination of the positional and vibrational characteristics of the machine. In this embodiment, the machine's operational mode may be determined based on a combination of the positional and vibrational modes, described above, that the machine is undergoing.

Figure 6:
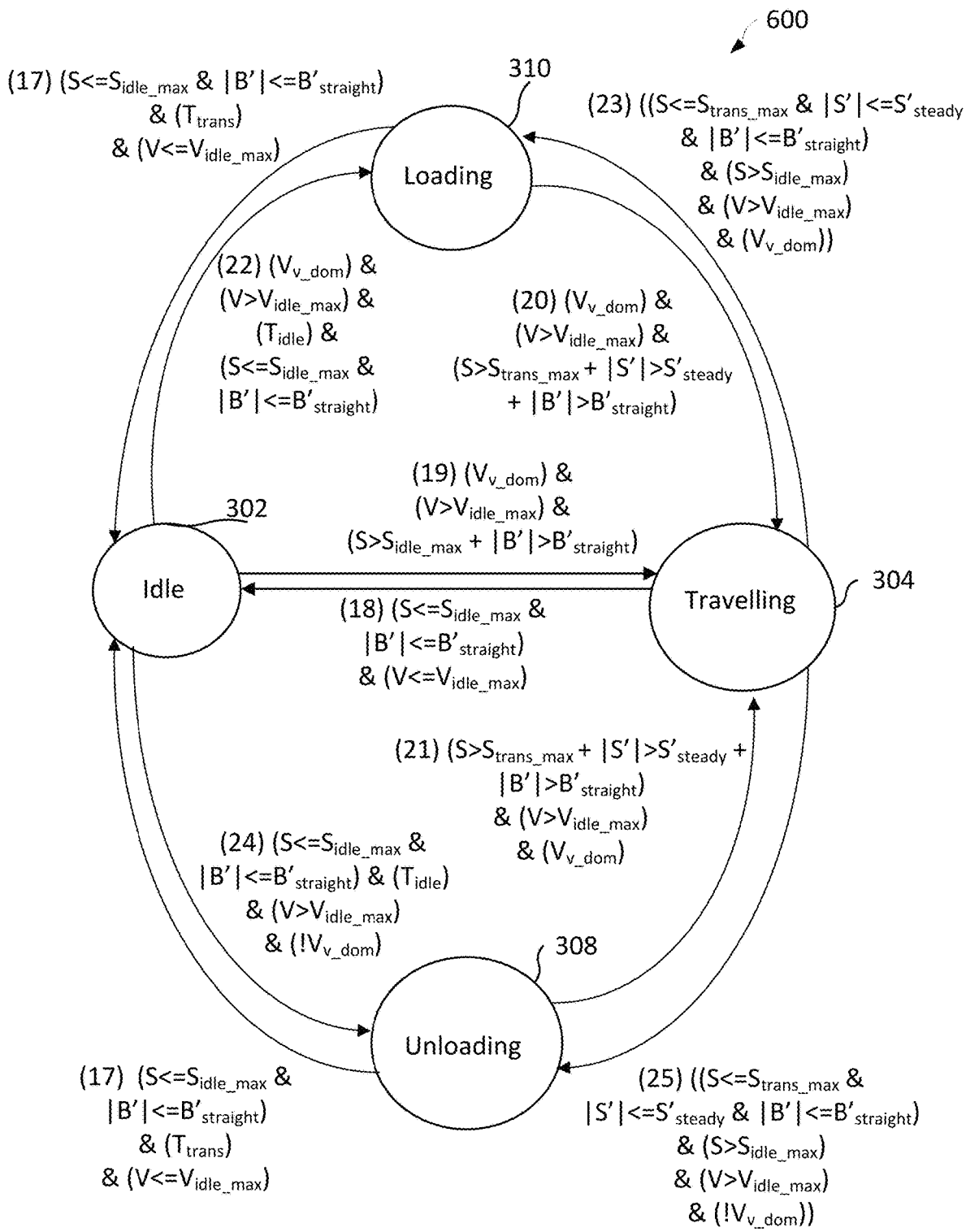
FIG. 6 is a state diagram that illustrates a state machine model that shows the transition between states when using a combination of positional and/or inertial and vibrational information, in accordance with an embodiment of the present disclosure.

FIG. 6 illustrates a state machine 600 which may be implemented by the processor 102 for operational modes based on a combination of position and vibration-based detection, showing states, state transitions, and transition trigger criteria. In this embodiment, the machine operational states may include an idle state 302, a travelling state 304, a loading state 310 and an unloading state 308. The figure lists trigger criteria in multiple rows, each relating to specific sensing technologies and/or complexities. They may be used in any combination (logically ANDed) to improve detection accuracy, though not all may be needed. For example, position-based time-outs (T) are not needed when combined with vibration-based detection, which has high accuracy in detecting operation of the transfer mechanism. Similarly, vehicle speed need not be used to distinguish the travelling state 304 to idle state 302 transition from travelling state 304 to transferring state transitions 306, i.e., loading state 310 or unloading state 308, when combined with vibration-based detection, which has high accuracy in identifying the idle state 302, e.g. the absence of vibration. The following describes criteria listed in FIG. 6, which may be used to trigger the transition into the related operational state. Other criteria, combinations, and simplifications may also be used, and the disclosure is not limited to those described.

FIG. 6 illustrates various expressions which may be implemented by the processor 102, such as by computer executable instructions stored in the memory 104 and executable by the processor 102 and evaluated thereby based on the data indicative of a particular measured characteristic received from one or more of the measurement subsystems 114 to determine the transition trigger criteria that is combination of position and vibration-based. In the expressions shown in FIG. 6 and explained below: V is vibration (all modes); S is vehicle speed; B is vehicle bearing; $V_{v\_dom}$ represents that vertical is the dominant vibrational mode; $V_{idle\_max}$ is maximum vibration when idle; $S_{trans\_max}$ is the maximum vehicle speed while transferring; $S_{idle\_max}$ is maximum vehicle speed while idle; $T_{idle}$ is the idle time-out; $T_{trans}$ is the transferring timeout; $S'_{steady}$ is the maximum rate of change of vehicle speed for steady operation; $B'_{straight}$ is the maximum rate of change of vehicle bearing for straight operation; X' is rate of change of a parameter X; |X| is the magnitude of parameter X; & is Logical AND; + is Logical OR; and ! is the Logical NOT. Vibration V may be determined by the vibrational measurement subsystem 112 based on, for example, a measurable acceleration experienced by an accelerometer or a signal generated by a load cell in response to a force. Machine speed S and bearing B may be determined by the positional/inertial measurement subsystem 110 based on, for example, a change or rate of change of a GPS, dead reckoning, etc. determined position, compass heading, or the like. An internal clock, GPS, or other timing device may be used to generate, measure or derive T.

In the idle state 302, the machine is at rest, neither transporting nor transferring material. In an embodiment, the machine may exit its current state and enter the idle state 302 when it has become stationary, i.e., its location and bearing remain constant with little vibration. As discussed previously, this combined trigger criteria excludes the position-based time-out listed with the transitions from the loading state 310 or the unloading state 308 to the idle state 302. Expression (17) shown below, represents the transition trigger criteria used to determine that the machine exits the unloading state 308 or the loading state 310 and enters the idle state 302. Expression (18) shown below, represent the transition trigger criteria used to determine that the machine exits the travelling state 304 and enters the idle state 302.

$$(S <= S_{idle\_max} \,\&\, |B'| <= B'_{straight}) \,\&\, (T_{trans}) \,\&\, (V < V_{idle\_max}) \quad (17)$$

$$(S <= S_{idle\_max} \,\&\, |B'| <= B'_{straight}) \,\&\, (V <= V_{idle\_max}) \quad (18)$$

In the travelling state 304, the machine is moving between geographic locations, either under its own power or via another vehicle, along with any material it may be carrying between loading, unloading or rest locations. In an embodiment, the machine may exit its current state and enter the travelling state 304 when its speed is higher than a set threshold and/or is varying in speed and/or bearing, with significant vibration dominated by the vertical mode. Alternatively, or in addition thereto, the machine may exit the transferring state 306 and enter the travelling state 304 when it has departed a known loading or unloading location. The transferring state 306 may include the loading state 310 and the unloading state 308. Expression (19) shown below, represents the transition trigger criteria used to determine that the machine exits the idle state 302 and enters the travelling state 304. Expression (20) represents the transition trigger criteria used to determine that the machine exits the loading state 310 and enters the travelling state 304. Expression (21) represents the transition trigger criteria used to determine that the machine exits the unloading state 308 and enters the travelling state 304.

$$(V_{v\_dom}) \& (V > V_{idle\_max}) \& (S > S_{idle\_max} + |B'| > B'_{straight}) \quad (19)$$

$$(V_{v\_dom}) \& (V > V_{idle\_max}) \& (S > S_{trans\_max} + |S'| > S'_{steady} + |B'| > B'_{straight}) \quad (20)$$

$$(S > S_{trans\_max} + |S'| > S'_{steady} + |B'| > B'_{straight}) \& (V > V_{idle\_max}) \& (V_{v\_dom}) \quad (21)$$

In the loading state 310, the machine may be transferring or preparing to transfer material into its storage carrier. In an embodiment, the machine may exit its current state and enter the loading state 310 when its speed has become lower than a set threshold and maintains a mainly-constant speed and bearing, with significant vibration dominated by the vertical mode. Alternatively, or in addition thereto, the machine may exit the travelling state 304 and enter the loading state 310 when it has arrived at a known loading location. Expression (22) shown below, represents the transition trigger criteria used to determine that the machine exits the idle state 302 and enters the loading state 310. Expression (23) shown below, represents the transition trigger criteria used to determine that the machine exits the travelling state 304 and enters the loading state 310.

$$(V_{v\_dom}) \& (V > V_{idle\_max}) \& (T_{idle}) \& (S <= S_{idle\_max} \& |B'| <= B'_{straight}) \quad (22)$$

$$((S <= S_{trans\_max} \& |S'| <= S'_{steady} \& |B'| <= B'_{straight}) \& (S > S_{idle\_max}) \& (V > V_{idle\_max}) \& (V_{v\_dom})) \quad (23)$$

In the unloading state 308, the machine may be transferring or preparing to transfer material out of its storage carrier. The machine may exit its current state and enter the unloading state 308 when its speed has become lower than a set threshold and maintains a mainly-constant speed and bearing, with significant vibration not dominated by the vertical mode. Alternatively, or in addition thereto, the machine may exit the travelling state 304 and enter the unloading state 308 when it has arrived at a known unloading location. Expression (24) shown below, represents the transition trigger criteria used to determine that the machine exits the idle state 302 and enters the unloading state 308. Expression (25) shown below, represents the transition trigger criteria used to determine that the machine exits the travelling state 304 and enters the unloading state 308.

$$(S <= S_{idle\_max} \& |B'| <= B'_{straight}) \& (T_{idle}) \& (V > V_{idle\_max}) \& (!V_{v\_dom}) \quad (24)$$

$$((S <= S_{trans\_max} \& |S'| <= S'_{steady} \& |B'| <= B'_{straight}) \& (S > S_{idle\_max}) \& (V > V_{idle\_max}) \& (!V_{v\_dom})) \quad (25)$$

In one embodiment, the data measured by the positional/inertial measurement subsystem 110 of the one or more plurality of measurement subsystems 114 is indicative, alone or in combination with the data measured by the vibrational measurement subsystem 112 of the other measurement subsystems 114, of a measurement of a simplified combination of positional and vibrational characteristics of the machine. In this embodiment, the machine's operational mode may be determined based on a simplified combination of the positional and vibrational modes, described above, that the machine is undergoing.

Figure 7:
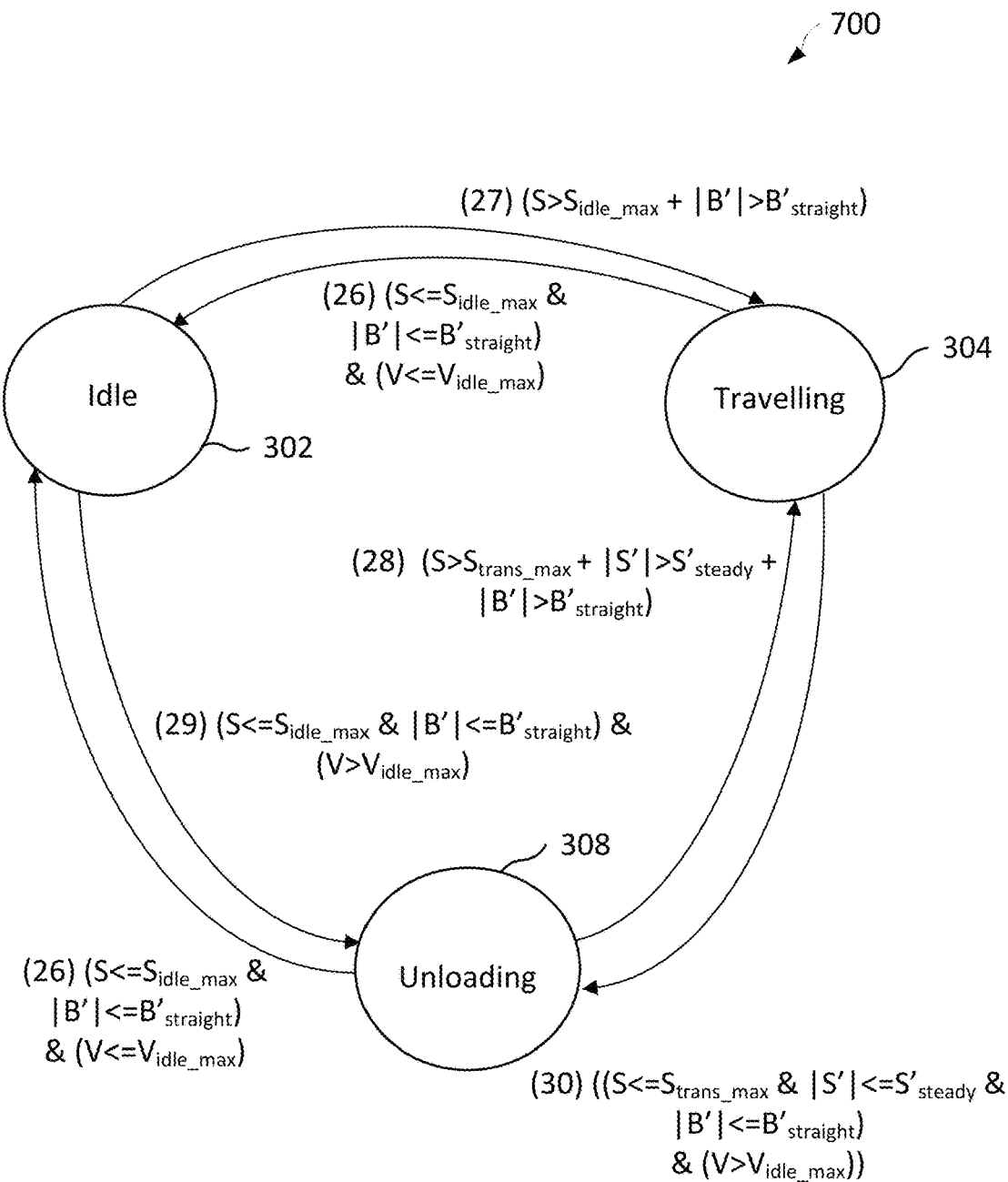
FIG. 7 is a state diagram that illustrates a state machine model that shows the transition between states when using a simplified combination of positional and/or inertial and vibrational information, in accordance with an embodiment of the present disclosure.

FIG. 7 illustrates a state machine 700 which may be implemented by the processor 102 for operational modes based on a simplified combination of position and vibration-based detection, showing states, state transitions, and transition trigger criteria. In this embodiment, operational states of the machine may include an idle state 302, a travelling state 304, and an unloading state 308. The figure lists trigger criteria in multiple rows, each relating to specific sensing technologies and/or complexities. They may be used in any combination (logically ANDed) to improve detection accuracy, though not all may be needed. Some trigger criteria related to positional or vibrational modes have been discarded to simply the process and sensing requirements, sacrificing the ability to detect a loading state. Notably, no time-outs or detection of vibrational modes are needed, because detection of vibrational presence is sufficient to separate the idle and unloading states when stationary, and elimination of the loading state obviates the need to use vibrational modes to distinguish it. Other criteria, combinations, and simplifications may also be used, and the disclosure is not limited to those described.

FIG. 7 illustrates various expressions which may be implemented by the processor 102, such as by computer executable instructions stored in the memory 104 and executable by the processor 102 and evaluated thereby based on the data indicative of a particular measured characteristic received from one or more of the measurement subsystems 114 to determine the transition trigger criteria that is based on a simplified combination of position and vibration-based detection. In the expressions shown in FIG. 7 and explained below: V is vibration (all modes); S is vehicle speed; B is vehicle bearing; $V_{idle\_max}$ is maximum vibration when idle; $S_{trans\_max}$ is the maximum vehicle speed while transferring; $S_{idle\_max}$ is maximum vehicle speed while idle; $S'_{steady}$ is the maximum rate of change of vehicle speed for steady operation; $B'_{straight}$ is the maximum rate of change of vehicle bearing for straight operation; X' is rate of change of a parameter X; |X| is the magnitude of parameter X; & is Logical AND; and + is Logical OR. Vibration V may be determined by the vibrational measurement subsystem 112 based on, for example, a measurable acceleration experienced by an accelerometer or a signal generated by a load cell in response to a force. Machine speed S and bearing B may be determined by the positional/inertial measurement subsystem 110 based on, for example, a change or rate of change of a GPS, dead reckoning, etc. determined position, compass heading, or the like.

In the idle state 302, the machine is at rest, neither transporting nor transferring material. In an embodiment, the machine may exit its current state and enter the idle state 302 when it has become stationary, i.e., its location and bearing remain constant, with little vibration. As discussed previously, this combined trigger criteria excludes the position-based time-out in the transition from the unloading state 308 to the idle state 302. Expression (26) shown below, represents the transition trigger criteria used to determine that the machine exits the unloading state 308 or the travelling state 304 and enters the idle state 302.

$$(S <= S_{idle\_max} \& |B'| <= B'_{straight}) \& (V <= V_{idle\_max}) \quad (26)$$

In the travelling state 304, the machine is moving between geographic locations, either under its own power or via another vehicle, along with any material it may be carrying between unloading or rest locations; as noted, this simplified state machine cannot detect whether the machine is being loaded. In an embodiment, the machine may exit its current state and enter the travelling state 304 when its speed is higher than a set threshold and/or is varying in speed and/or bearing. Alternatively, or in addition thereto, the machine may exit the unloading state 308 and enter the travelling state 304 when it has departed a known unloading location. Expression (27) shown below, represents the transition trigger criteria used to determine that the machine exits the idle state 302 and enters the travelling state 304. Expression (28) shown below, represents the transition trigger criteria used to determine that the machine exits the unloading state 308 and enters the travelling state 304.

$$(S > S_{idle\_max} + |B'| > B'_{straight}) \tag{27}$$

$$(S > S_{trans\_max} + |S'| > S'_{steady} + |B'| > B'_{straight}) \tag{28}$$

In the unloading state 308, the machine may be transferring or preparing to transfer material out of its storage carrier. In an embodiment, the machine may exit its current state and enter the unloading state 308 when its speed is less than a set threshold and maintains a mainly-constant speed and bearing, with significant vibration. Alternatively, or in addition thereto, the machine may exit the travelling state 304 and enter the unloading state 308 when it has arrived at a known unloading location. Expression (29) shown below, represents the transition trigger criteria used to determine that the machine exits the idle state 302 and enters the unloading state 308. Expression (30) shown below, represents the transition trigger criteria used to determine that the machine exits the travelling state 304 and enters the unloading state 308.

$$(S <= S_{idle\_max} \ \& \ |B'| <= B'_{straight}) \ \& \ (V > V_{idle\_max}) \tag{29}$$

$$((S <= S_{trans\_max} \ \& \ |S'| <= S'_{steady} \ \& \ |B'| <= B'_{straight}) \ \& \ (V > V_{idle\_max})) \tag{30}$$

In another embodiment, the data measured by the positional/inertial measurement subsystem 110 of the one or more plurality of measurement subsystems 114 is indicative, alone or in combination with the data measured by the vibrational 112 and weight measurement 108 subsystems of the other measurement subsystems 114, of a measurement of a combination of the positional, vibrational, and weight characteristics of the machine. In this embodiment, the machine's operational mode may be determined based on a combination of the positional, vibrational and weight behavior modes, described above, that the machine is undergoing to provide further selectivity, i.e., improved accuracy.

Figure 8:
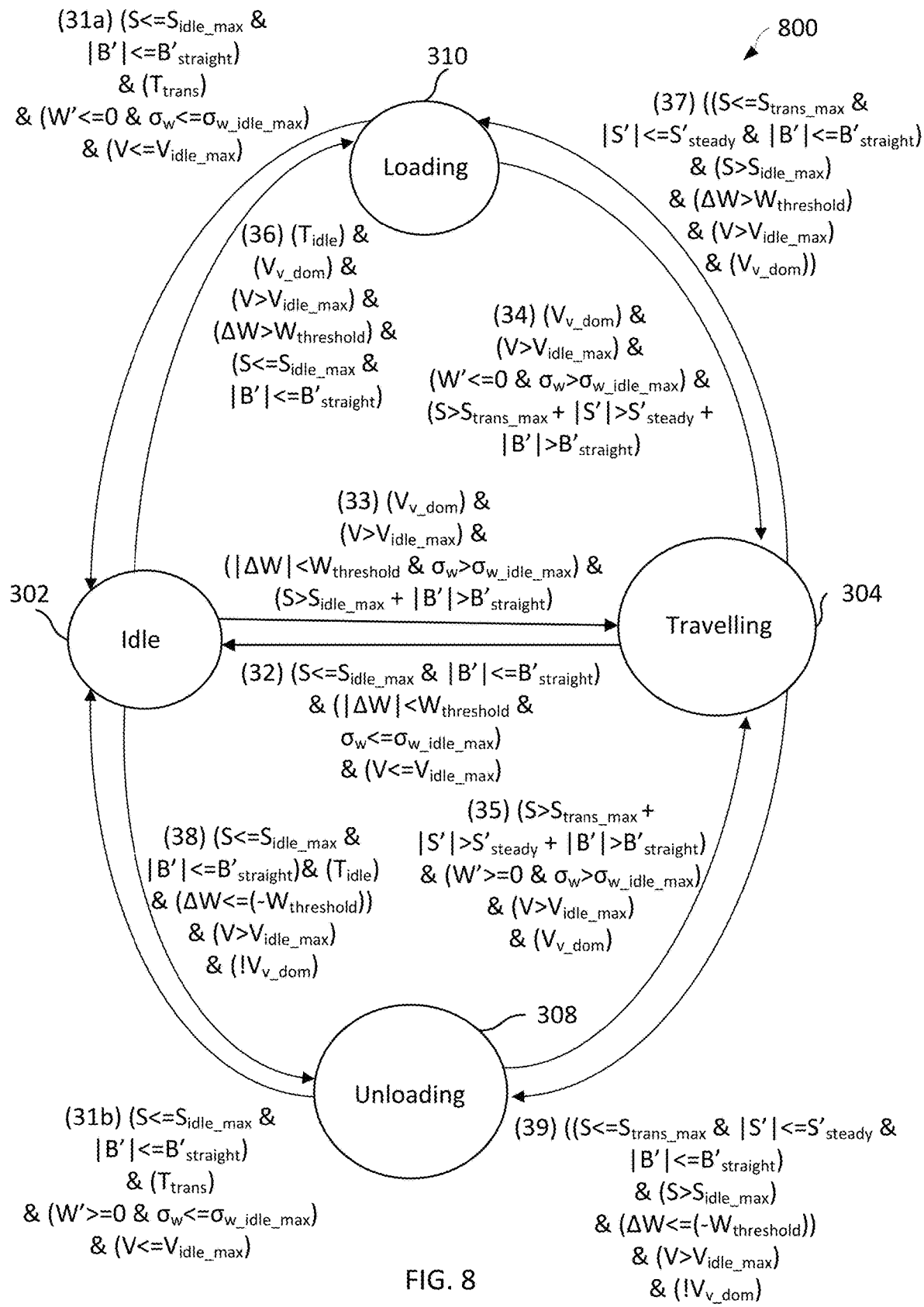
FIG. 8 is a state diagram that illustrates a state machine model that shows the transition between states when using a combination of positional and/or inertial, vibrational, and weight information, in accordance with an embodiment of the present disclosure.

FIG. 8 illustrates a state machine 800 which may be implemented by the processor 102 for operational modes based on a combination of position, vibration, and weight-based detection, showing states, state transitions, and transition trigger criteria. In this embodiment, the operational states of the machine may include an idle state 302, a travelling state 304, an unloading state 308, and a loading state 310. FIG. 8 lists trigger criteria in multiple rows, each relating to specific sensing technologies and/or complexities. They may be used in any combination (logically ANDed) to improve detection accuracy, though not all may be needed. For example, position-based time-outs (T) are not needed when combined with vibration-based detection, which has high accuracy in detecting operation of the transfer mechanism. Similarly, vehicle speed need not be used to distinguish the travelling to idle state transition from the travelling to unloading state transition when combined with vibration-based detection, which has high accuracy in identifying the idle state, e.g. the absence of vibration. The following describes criteria listed in the figure, which may be used to trigger the transition into the related operational state. Other criteria, combinations, and simplifications may also be used, and the disclosure is not limited to those described.

FIG. 8 illustrates various expressions which may be implemented by the processor 102, such as by computer executable instructions stored in the memory 104 and executable by the processor 102 and evaluated thereby based on the data indicative of a particular measured characteristic received from one or more of the measurement subsystems 114 to determine the transition trigger criteria that is based on a combination of position, vibration, and weight-based detection. In the expressions shown in FIG. 8 and explained below: V is vibration (all modes); S is vehicle speed; B is vehicle bearing; W is the payload weight; $V_{v\_dom}$ represents that vertical is the dominant vibrational mode; $V_{idle\_max}$ is maximum vibration when idle; $S_{trans\_max}$ is the maximum vehicle speed while transferring; $S_{idle\_max}$ is maximum vehicle speed while idle; $\sigma_{w\_idle\_max}$ is the maximum weight variability while idle; $T_{idle}$ is the idle time-out; $T_{trans}$ is the transferring timeout; $W_{threshold}$ is the threshold of significant weight change; $S'_{steady}$ is the maximum rate of change of vehicle speed for steady operation; $B'_{straight}$ is the maximum rate of change of vehicle bearing for straight operation; $\Delta X$ is the difference of values of parameter X; $\sigma_X$ is the standard deviation of parameter X; X' is rate of change of a parameter X; |X| is the magnitude of parameter X; & is Logical AND; + is Logical OR; and ! is the Logical NOT. Vibration V may be determined by the vibrational measurement subsystem 112 based on, for example, a measurable acceleration experienced by an accelerometer or a signal generated by a load cell in response to a force. Machine speed S and bearing B may be determined by the positional/inertial measurement subsystem 110 based on, for example, a change or rate of change of a GPS, dead reckoning, etc. determined position, compass heading, or the like. An internal clock, GPS, or other timing device may be used to generate, measure or derive T. Weight W may be determined by the weight measurement subsystem 108 based on, for example, a change in voltage output of a load cell, a piezoelectric sensor, or a pressure transducer, e.g. coupled with the material container of the machine, as a response to a force applied.

In the idle state 302, the machine is at rest, neither transporting nor transferring material. In an embodiment, the machine may exit its current state and enter the idle state 302 when it has become stationary, i.e., its location and bearing remain constant, with little vibration, its weight being both stable, i.e., nominally unchanged or its rate of change reaching or surpasses zero, and with little variability (deterministic or random). As discussed previously, this combined trigger criteria excludes the position-based time-out in the transitions from the loading state 310 or the unloading state 308 to the idle state 302. Expression (31a) shown below, represents the transition trigger criteria used to determine that the machine exits the loading state 310 and enters the idle state 302. Expression (31b) shown below, represents the transition trigger criteria used to determine that the machine exits the unloading state 308 and enters the idle state 302. Expression (32) shown below, represents the transition trigger criteria used to determine that the machine exits the travelling state 304 and enters the idle state 302.

$$(S <= S_{idle\_max} \ \& \ |B'| <= B'_{straight}) \ \& \ (T_{trans}) \ \& \ (W' <= 0 \ \& \ \sigma_w <= \sigma_{w\_idle\_max}) \ \& \ (V <= V_{idle\_max}) \tag{31a}$$

$$(S <= S_{idle\_max} \ \& \ |B'| <= B'_{straight}) \ \& \ (T_{trans}) \ \& \ (W' >= 0 \ \& \ \sigma_w <= \sigma_{w\_idle\_max}) \ \& \ (V <= V_{idle\_max}) \tag{31b}$$

$$(S <= S_{idle\_max} \ \& \ |B'| <= B'_{straight}) \ \& \ (|\Delta W| < W_{threshold} \ \& \ \sigma_w <= \sigma_{w\_idle\_max}) \ \& \ (V <= V_{idle\_max}) \tag{32}$$

In the travelling state 304, the machine is moving between geographic locations, either under its own power or via another vehicle, along with any material it may be carrying between loading, unloading, or rest locations. In an embodiment, the machine may exit its current state and enter the travelling state 304 when its speed becomes higher than a set threshold and/or its speed and/or bearing become variable, with significant vibration dominated by the vertical mode, its weight being stable, e.g. nominally unchanged or its rate of change reaching or surpasses zero, but with significant variability (deterministic or random). Alternatively, or in addition thereto, the machine may exit the loading state 310 or the unloading state 308 and enter the travelling state 304 when it has departed a known loading or unloading location, respectively. Expression (33) shown below, represents the transition trigger criteria used to determine that the machine exits the idle state 302 and enters the travelling state 304. Expression (34) shown below, represents the transition trigger criteria used to determine that the machine exits the loading state 310 and enters the travelling state 304. Expression (35) shown below, represents the transition trigger criteria used to determine that the machine exits the unloading state 308 and enters the travelling state 304.

$$(V_{v\_dom}) \& (V>V_{idle\_max}) \& (|\Delta W|<W_{threshold} \& \sigma_w>\sigma_{w\_idle\_max}) \& (S>S_{idle\_max}+|B'|>B'_{straight}) \quad (33)$$

$$(V_{v\_dom}) \& (V>V_{idle\_max}) \& (W'<=0 \& \sigma_w>\sigma_{w\_idle\_max}) \& (S>S_{trans\_max}+|S'|>S'_{steady}+|B'|>B'_{straight}) \quad (34)$$

$$(S>S_{trans\_max}+|S'|>S'_{steady}+|B'|>B'_{straight}) \& (W'>=0 \& \sigma_w>\sigma_{w\_idle\_max}) \& (V>V_{idle\_max}) \& (V_{v\_dom}) \quad (35)$$

In the loading state 310, the machine may be loading or preparing to load material into its storage carrier. In an embodiment, the machine may exit its current state and enter the loading state 310 when its speed is less than a set threshold and maintains a mainly-constant speed and bearing, with significant vibration dominated by the vertical mode, and with increasing weight. Alternatively, or in addition thereto, the machine may exit the travelling state 304 and enter the loading state 308 when it has arrived at a known loading location. Expression (36) shown below, represents the transition trigger criteria used to determine that the machine exits the idle state 302 and enters the loading state 310. Expression (37) shown below, represents the transition trigger criteria used to determine that the machine exits the travelling state 304 and enters the loading state 310.

$$(T_{idle}) \& (V_{v\_dom}) \& (V>V_{idle\_max}) \& (\Delta W>W_{threshold}) \& (S<=S_{idle\_max} \& |B'|<=B'_{straight}) \quad (36)$$

$$((S<=S_{trans\_max} \& |S'|<=S'_{steady} \& |B'|<= B'_{straight}) \& (S>S_{idle\_max}) \& (\Delta W>W_{threshold}) \& (V>V_{idle\_max}) \& (V_{v\_dom})) \quad (37)$$

In the unloading state 308, the machine may be transferring or preparing to transfer material from its storage carrier. In an embodiment, the machine may exit its current state and enter the unloading state 308 when its speed has become less than a set threshold and maintains a mainly-constant speed and bearing, with significant vibration not dominated by the vertical mode, and with decreasing weight. Alternatively, or in addition thereto, the machine may exit the travelling state 304 and enter the unloading state 308 when it has arrived at a known unloading location. Expression (38) shown below, represents the transition trigger criteria used to determine that the machine exits the idle state 302 and enters the unloading state 308. Expression (39) shown below, represents the transition trigger criteria used to determine that the machine exits the travelling state 304 and enters the unloading state 308.

$$(S<=S_{idle\_max} \& |B'|<=B'_{straight}) \& (T_{idle}) \& (\Delta W<=(-W_{threshold})) \& (V>V_{idle\_max}) \& (!V_{v\_dom}) \quad (38)$$

$$((S<=S_{trans\_max} \& |S'|<=S'_{steady} \& |B'|<= B'_{straight}) \& (S>S_{idle\_max}) \& (\Delta W<=(-W_{threshold})) \& (V>V_{idle\_max}) \& (!V_{v\_dom})) \quad (39)$$

In another embodiment (not shown), the data measured by the positional/inertial measurement subsystem 110 of the one or more plurality of measurement subsystems 114 is indicative, alone or in combination with the data measured by the weight measurement subsystem 108 of the other measurement subsystems 114, of a measurement of a combination of the positional and weight characteristics of the machine. In this embodiment, the machine's operational mode may be determined based on a combination of the positional and weight behavior modes that the machine is undergoing.

In another embodiment (not shown), the data measured by the vibrational measurement subsystem 112 of the one or more plurality of measurement subsystems 114 is indicative, alone or in combination with the data measured by the weight measurement subsystem 108 of the other measurement subsystems 114, of a measurement of a combination of the vibrational and weight characteristics of the machine. In this embodiment, the machine's operational mode may be determined based on a combination of the vibrational and weight behavior modes that the machine is undergoing.

Using the detection of the operational states of the machine, described above, the weight of the vehicle's payload, and possibly portions of the vehicle itself, may be recorded when the operational state changes, generally or in a particular manner, alone or in combination with other factors. An example of operational state changes may include when transitioning into or out of the transferring, idle, travelling, loading, or unloading states. Other factors may include when distinct or specific operational state changes are detected and/or when patterns or sequences of operational state changes are detected, e.g. loading to travelling to unloading, idle to loading, loading or unloading to idle, and the like. This may be also recorded with other information, such as, but not limited to operational state, date and time, location, operator, and the like. In one embodiment, when other particular operational state changes are determined, recording may be inhibited to prevent anomalous data from being recorded.

Using the detection of the operational state, or a change thereof, as described above, the amount of material transferred may be determined. The determination of the amount of material may be accomplished by recording the weight when the operational state changes, as described above, and calculating and recording the difference between these weights. In particular, the difference between the weight detected when entering and exiting the transferring state may be useful. These events may be also recorded with other information, such as, but not limited to date and time, location, etc. The differences in weights may be accumulated in order to determine the amount of material transferred over a longer period of time. A check that the weight calculated, i.e., the amount of material transferred, exceeds a preset or dynamically computed threshold can be performed to detect whether the weight is valid, the weight exceeds the threshold, or the result of a state transition error.

Using the detection of the operational state, or a change thereof, as described above, the location of a material transfer may be determined. The location may be then used to locate the transfer within a geospatially defined region, such as a field, a grain terminal, a grain bin, and the like. The location of the transfer may also be distributed, in the case of a grain bag.

Using the detection of the operational state, or a change thereof, as described above, the amount of time spent in each operational state can be determined. This may be accomplished by recording a timestamp when the operational state changes and calculating or recording the difference between those timestamps. These differences, or durations, may be accumulated in order to determine the amount of time spent in each mode over a longer period of time.

In another embodiment, the source may be a machine and/or a geographic location from which a material is unloaded. The destination may be a second machine and/or a second geographic location to which the material is loaded or transferred, of a transfer. The transfer may be detected by the above described embodiments or by other means and may be determined by correlating the detected and/or recorded transfers between multiple machines. This determination or correlation may be performed by a device separate from, but in direct or indirect communication with, the system or device which determines the operational states and transfers. The system or device may include a computer, a mobile device, such as a smartphone or tablet, or a remote server connected via the Internet. The determination may be performed by retrieving, via a wired and/or wireless communications network, recorded transfer data that is stored by the system described above, from the machines, or devices associated therewith or affixed thereto, associated with the transfers. The determination may be performed by correlating transfer events detected by multiple machines in time, time-proximity, time-intersection, time-quantity, or a combination thereof. Note that it is possible for a transfer to have multiple sources and/or multiple destinations. For example, the source of the transfer is from a first machine and from a first static location and the destination is to a second machine and to a second static location.

Figure 9:
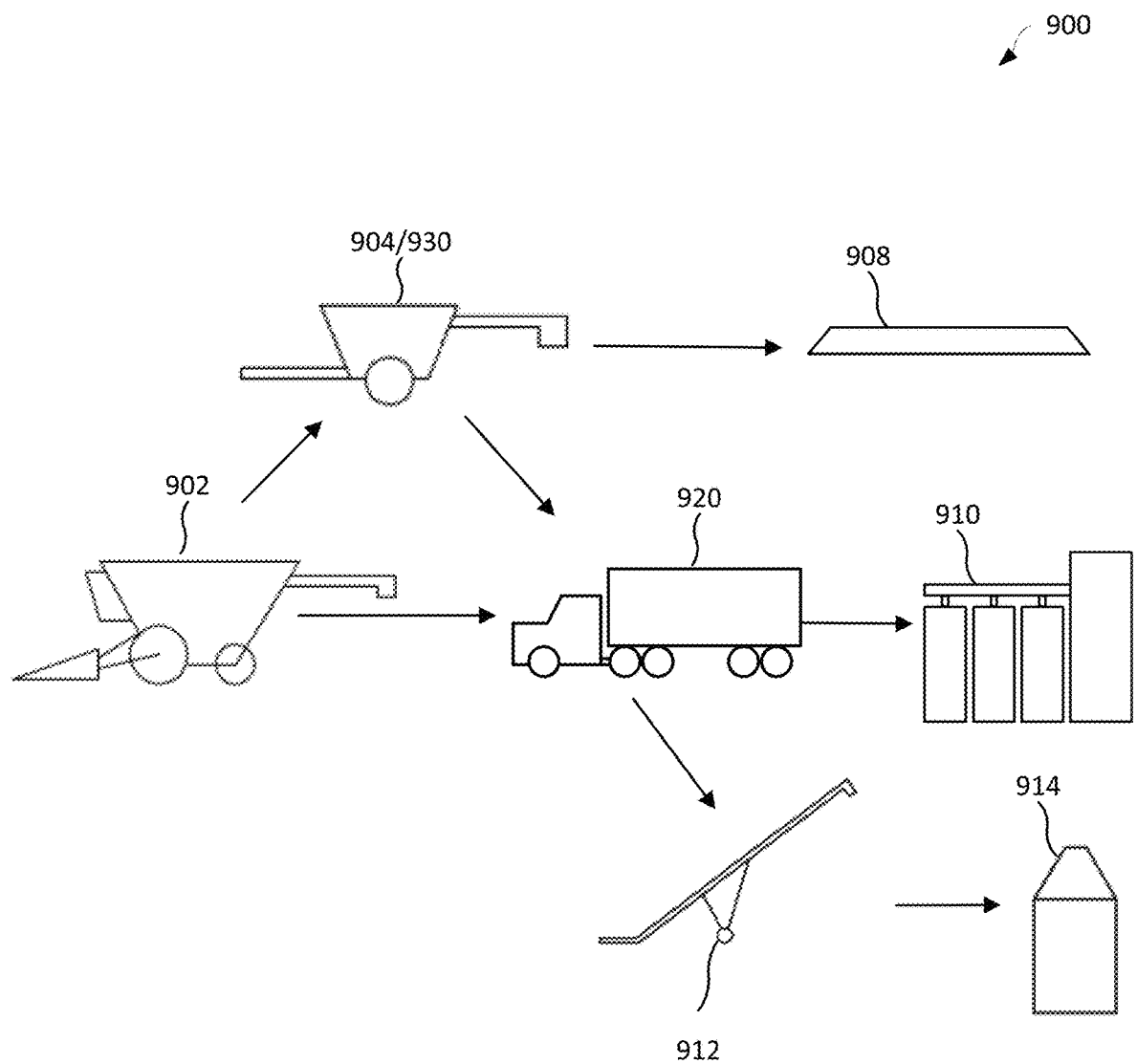
FIG. 9 is a schematic depiction of a system for commodity movement tracking through various machines and locations, in accordance with an embodiment of the present disclosure.

FIG. 9 depicts a system 900 to track commodity movement through various agricultural machines and locations according to an embodiment. The system 900 includes a combine 902, a grain cart 904 (with or without an integrated conveyor 930), a truck 920, a grain bag 908, a grain terminal/elevator 910, an auger 912, and a grain bin 914. Referring to FIG. 9, a transfer may be performed from a grain cart 904 to a truck 920. In this example, the grain cart 904 is identified as the source machine and the position in which the transfer occurred is identified as the source location which may be determined to be in a specific field. This technique may then be used to track the movement of material through a number of transfers.

The simplest method of determining the source and destination of a transfer event is by detecting the time correlation of transfer events by multiple machines. The detecting the time correlation of transfer events occurs when transfer events are detected by multiple machines within the same window of time within a predetermined tolerance. The direction of the transfer may be gleaned by knowing via an initial configuration or setup the type of equipment involved in the transfer and the types of transfers associated with the equipment type. In an embodiment, as shown in FIG. 9, a transfer involving a combine 902 and a grain cart 904 is generally known to flow from the combine 902 to the grain cart 904. A transfer involving a grain cart 904 and a truck 920 is generally known to flow from the grain cart 904 to the truck 920. Separate multiple concurrent transfers, i.e., transfers occurring nearly or fully simultaneously between multiple sets of machines, may require additional data from a user or other data to separate them.

A method that includes correlating the transfer in time-proximity is identical to the method that includes using time-based correlation, except that it is further restricted by requiring that the transfers are geographically proximate to each other within some predetermined tolerance. The distance maybe determined with positional data recorded for each transfer, or with a relative distance indication, such as the signal strength received from wireless, optical or acoustic beacons. This method can separate multiple concurrent transfers.

A method that includes correlating the transfer in time-intersection is identical to the method that includes using the time-based correlation method, except that it is further restricted by requiring that the transfer intersects geometrically with a polygon associated with another piece of equipment within some predetermined tolerance. This intersection may be determined using orientation data, such as from a magnetometer, to calculate an azimuth vector associated with the material flow through the conveyor and detecting whether the azimuth vector intersects with a predetermined polygon corresponding with the shape and location of the other piece of equipment.

Figure 10:
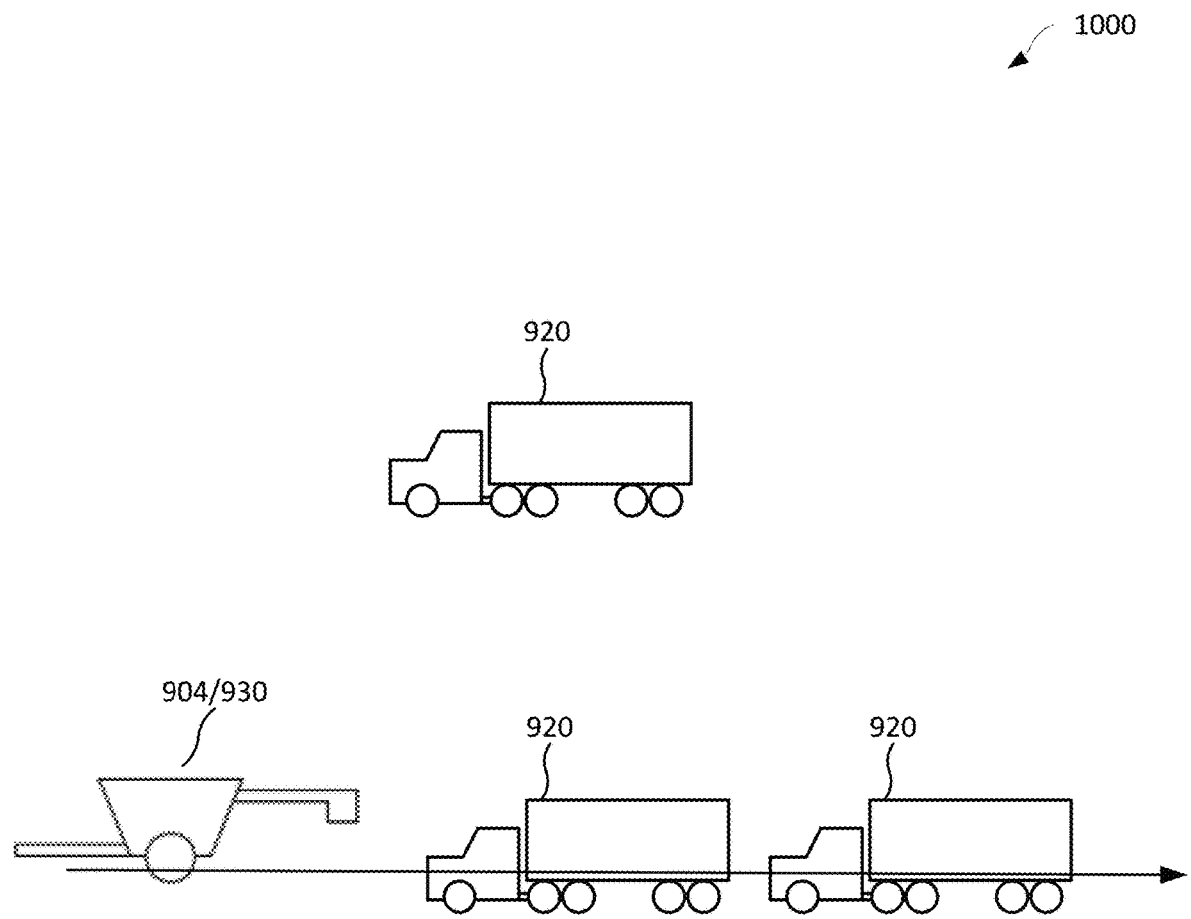
FIG. 10 is a schematic depiction of a system to determine the potential destination of a grain transfer from a grain cart, in accordance with an embodiment of the present disclosure.

FIG. 10 depicts a system 1000 to determine the potential destination, e.g. to one or more trucks 920, of a grain transfer from a grain cart 904 (with or without an integrated conveyor) according to an embodiment of the present disclosure. For equipment types where an integrated (or separate) conveyor 930 unloads material from the equipment, the vector intersection search extends outward from the machine along the vector only in the direction of the material flow through the conveyor 930 to the first of the one or more trucks 920 along that vector, i.e. the first intersection.

Figure 11:
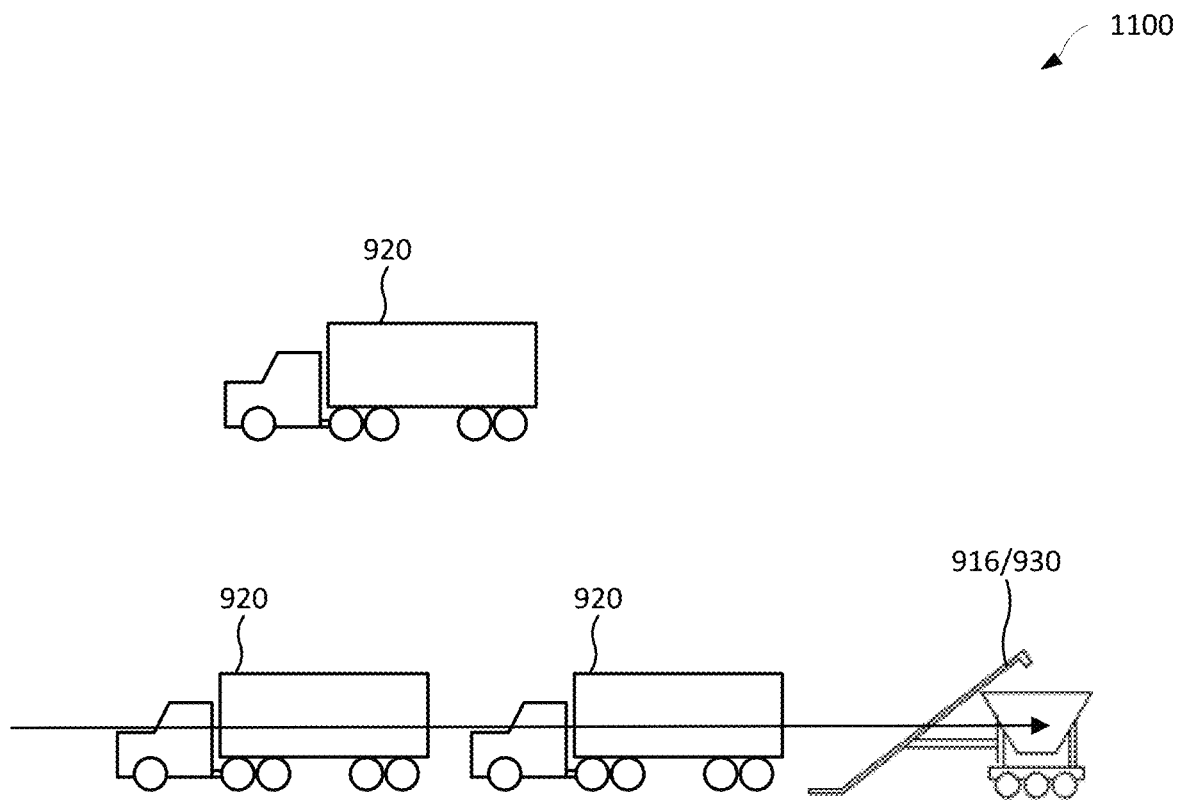
FIG. 11 is a schematic depiction of a system to determine the potential source of a grain transfer to a seed tender, in accordance with an embodiment of the present disclosure.

FIG. 11 shows a system 1100 to determine the potential source of a grain transfer, e.g. from one or more trucks 920, to a seed tender 916 according to an embodiment. For equipment types where an integrated (or separate) conveyor 930 loads material into the equipment, the vector intersection search extends outward from the machine along the vector only in the reverse direction of the material flow through the conveyor 930 to the first of the one or more trucks 920 along that vector, i.e. the first intersection.

Figure 12:
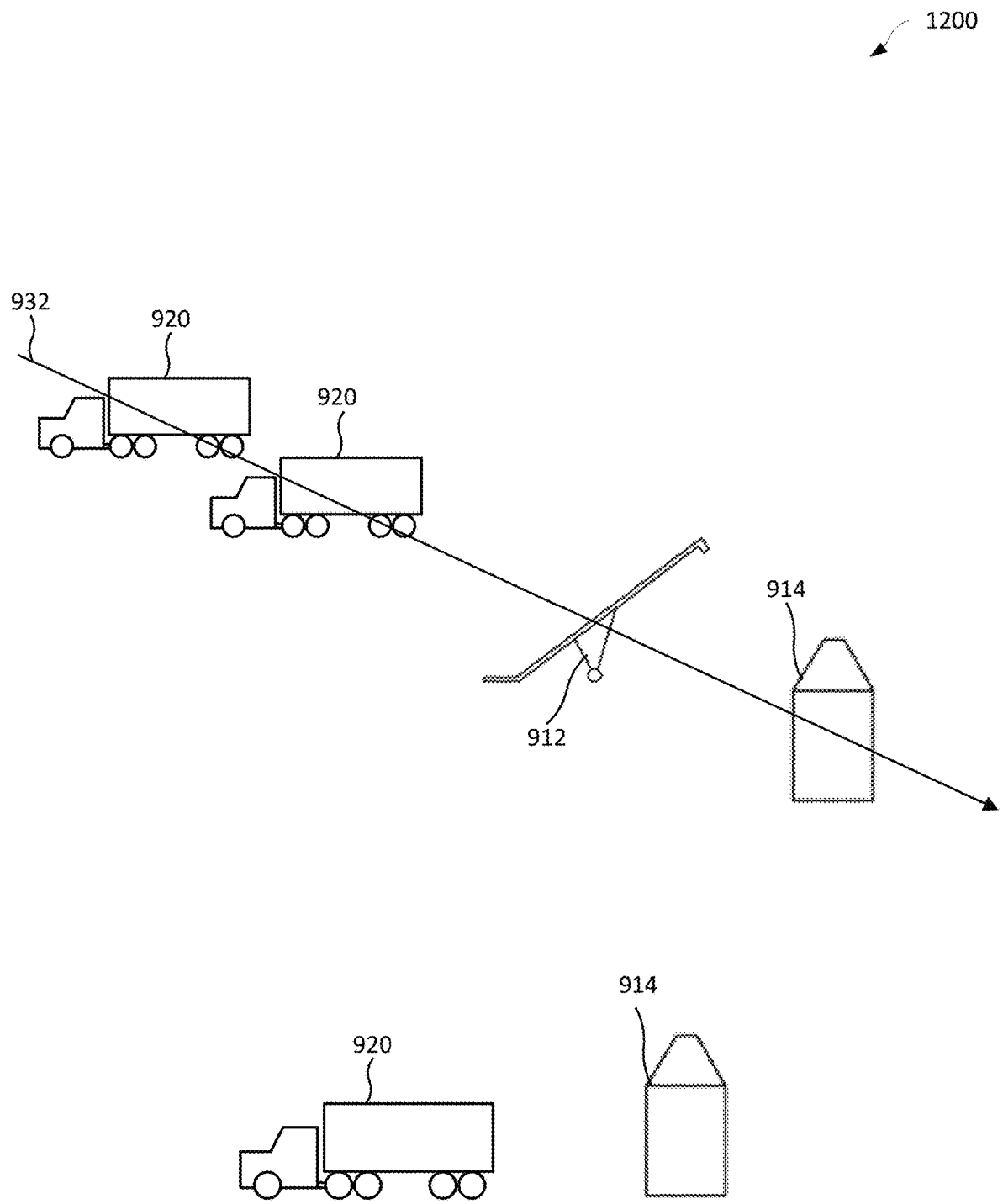
FIG. 12 is a schematic depiction of a system to determine the potential source and destination of a grain transfer to and from a grain auger, in accordance with an embodiment of the present disclosure.

FIG. 12 depicts a system 1200 to determine the potential source, e.g. one or more trucks 920, and destination, e.g. one or more grain bins 914, of a grain transfer to and from a grain auger 912 according to an embodiment. For a transfer conveyor 932, which is separate from a machine, the vector intersection search travels in both directions as described above in order to determine the source and destination of the transfer along the vector, i.e. the first intersection. Note in FIG. 12, the potential sources of the transfer have been located, but not the destination as the transfer was directed to a grain bin 914 with no instrumentation for detecting transfers. Note that this approach does not rely on the proximity between the machines. This method is able to separate multiple concurrent transfers.

A method that includes correlating the transfer in time-quantity is identical to the method that includes using time-based correlation, except that it is further restricted by requiring that the transfer amounts be close to each other, within some predetermined tolerance. This method is able to separate multiple concurrent transfers.

Any of the methods described above may be used in any combination to reduce the ambiguity of separating multiple concurrent transfers.

FIG. 9 depicts a system 900 in which there is a flow of grain. In an embodiment, a grain flows from a combine 902 to a grain cart 904 to a truck 920 to a destination. A grain cart 904 is a mobile storage carrier towed by a tractor 940 (shown in FIG. 13) with an integrated discharge auger. The grain cart 904 is used to transport grain from combine harvesters to destinations, such as trucks, grain bags, grain piles, or mobile or stationary bins. The combine 902 includes a carrier, i.e., a hopper. The combine 902 harvests the grain and deposits it into the hopper. The role of the grain cart 904 is to receive and unload the grain from the combine 902 prior to the hopper filling to capacity to ensure continuous harvesting. Due to the mechanical demands of threshing grain, a combine 902 typically moves in a slow and steady manner, generally travelling straight or with gentle curves. Additionally, while transferring grain from the combine 902 to the grain cart 904, the grain cart 904 must synchronize its motion with the combine 902 to facilitate safe operation and avoid grain spillage. Once the combine 902 has finished unloading, the grain cart 904 will then increase its speed and adjust its bearing to efficiently reach its destination. Upon arrival at the unload destination, the grain cart 904 then stops and prepares to unload. This involves engaging the auger of the grain cart 904 and then opening the discharge gate so that grain may flow from the carrier of the grain cart 904 through its integrated auger to its destination. While the grain cart 904 is unloading, it is either stationary or moves very slowly. For instance, when filling a truck 920, the grain cart 904 remains at a particular location while the truck 920 fills, then changes position such that the level of the trailer of the truck 920 can be filled reasonably evenly. In the case of a grain bag 908, the grain bagging machine creeps ahead slowly as the grain bag 908 fills, and the grain cart 904 must adjust its position to match. Once the unloading has completed, the discharge gate is closed, any remaining grain in the auger is discharged, and the auger is disabled. The grain cart 904 then typically waits at that location, drives to a different waiting location, or immediately drives to a combine 902 to begin the cycle again. The truck 920 then drives to a destination, such as a grain terminal/elevator 910 or a grain bin 914. In the case of a grain bin 914, the transfer may occur through a grain auger 912, with the grain auger 912 receiving grain from the truck 920 and depositing it in the grain bin 914.

Figure 13:
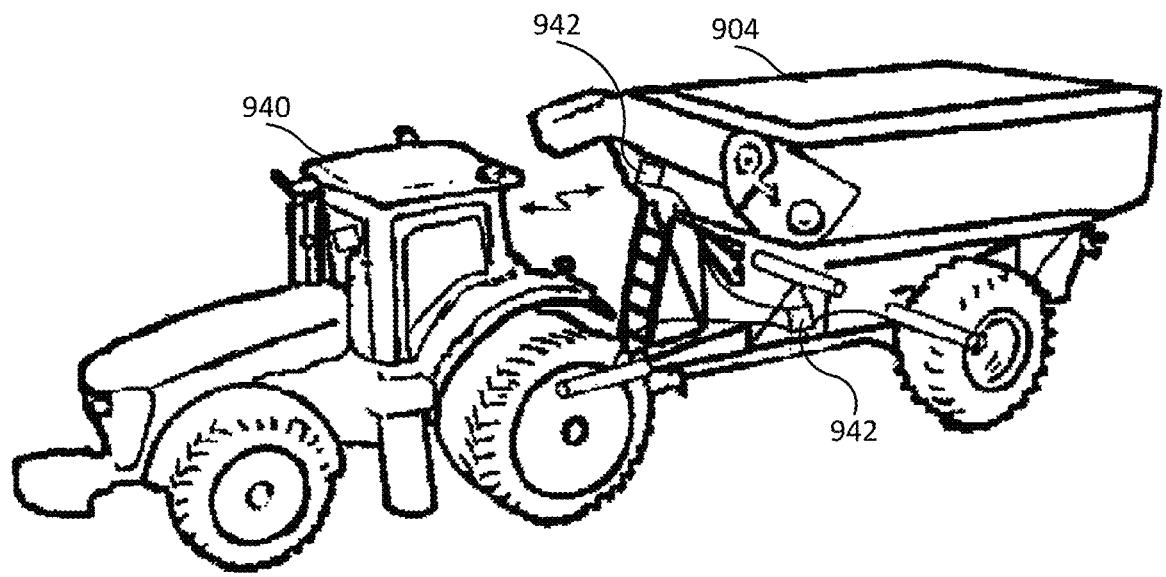
FIG. 13 is a drawing of a plurality of sensors installed in a grain cart, in accordance with an embodiment of the present disclosure.

FIG. 13 is a drawing showing a tractor 940 towing a grain cart 904. The grain cart 904 has a plurality of sensors 942 installed, in accordance with an embodiment of the present disclosure. Additionally, the plurality of sensors 942 may be installed in multiple machines, i.e., the combine 902, the truck 920, and the grain auger 912. The state of the various sensors 942 on the grain cart 904, combine 902, truck 920, and grain auger 912 during the various phases of the cycle described above, is described below. Note that the sensors may not be installed on all machines, but the use of them on multiple machines facilitates tracking the source and destination of the transfer.

In an embodiment, a material is transferred from a combine 902 to a grain cart 904. In this embodiment, the material transferred may be grain. While the combine 902 unloads to the grain cart 904, the speed detected by the position measurement subsystem on both the combine 902 and the grain cart 904 is slow and mainly constant or changing gradually, and the bearing detected is mainly constant or changing gradually. The vibration detected on the cart is mainly in the vertical mode due to the travel of the grain cart 904 and lack of vibration due to the auger. The vibration detected on the combine 902 is large if the vibration sensor is mounted on the discharge auger of the combine 902. The weight detected on the grain cart 904 rises during loading, and is variable while the grain cart 904 is moving. The weight detected on the combine 902, if supported, decreases during the transfer and is variable while the combine 902 is moving. When the loading is complete, the speed detected on the grain cart 904 increases and the bearing changes. The speed and bearing of the combine 902 typically remain unchanged after the transfer is completed. The amount of grain loaded is the difference between the weight before and after the transfer on both devices, if supported. By detecting a transfer event both from the combine 902 and the grain cart 904, the correlation of the events allows the source of the transfer to be identified as a specific combine, and the destination as a specific grain cart. The location of the transfer may also be correlated to a field, via a field boundary definition consisting of a set of latitude and longitude coordinates. Note that this process could be recorded, for example, from a combine to a truck instead, and the cart measurements described would be measured on the truck instead.

In an embodiment, a grain cart 904 travels to an unload destination. While the grain cart 904 is travelling to the unload destination, the speed detected is higher and both the speed and the bearing are more variable relative to these parameters while loading. The vibration detected is mainly in the vertical mode due to the travel of the grain cart 904 and a lack of vibration of the auger. Finally, the weight detected is nominally unchanged but variable while traveling.

In an embodiment, the grain cart 904 unloads to a truck 920 or to a grain bag 908. At the start of the unload process, the grain cart 904 position is detected as stationary and vibration due to the motion of the auger is detected. Note that the specific mode of vibration is not important, as any vibration must be due to the auger given that the machine is stopped. While unloading, the position of the grain cart 904 is detected as mainly stationary, in other words, moving at a very slow speed, and vibration continues to be detected. If the auger is disabled before the grain cart 904 leaves the unload location, little vibration is detected while the position remains detected as stationary or the speed detected as very slow. If the auger is disabled after the grain cart 904 leaves the unload location, the speed and bearing change while the vibration remains detected. Either event signals the end of the unload process. The amount of grain unloaded is the difference between the cart weight before and after the transfer. If unloading occurs while the cart is stationary, it may be advantageous to inhibit exiting the unloading state until the machine moves a predetermined distance from the unloading location. This is because certain machine designs suffer a problem wherein the stresses experienced by the weighing sensors are not properly relieved after unloading, referred to as "mechanical binding," in other words, the measured weights may not be accurate, until the machine has moved some distance forward. Mechanical binding may be detected with a change in position, an increase in the variability of the weight, or a small increase in the weight, as was described above. If the load is received by a truck 920, the position of the truck 920 is detected as stationary and the weight, if supported, is increased. It may be possible to rely on a relative increase in weight, without requiring it be accurate. This is because the weight decrease recorded by the grain cart 904 can be relied on for an accurate measurement of the quantity, and the increase detected on the truck 920 can be used for the purpose of determining the specific truck as the destination of the transfer. The source of the transfer may be detected as a specific grain cart and the destination as a specific truck. If the load is transferred to a grain bag 908, the position gradually changes during the transfer rather than occur at discrete locations and the positional range may be recorded as the destination of the transfer. The location of the transfer may additionally be correlated to a field, via a field boundary definition.

In an embodiment, at any point in the cycle of loading, travelling, and unloading, the grain cart 904 or the truck 920 may wait for a transfer event. In this case, the position is detected as stationary and the weight is detected as stable.

In an embodiment, the truck 920 travels to an unload location. While the truck is travelling to the grain bin 914, the speed detected is high and variable. The vibration detected is mainly in the vertical mode due to the travel of the truck 920. Finally, the weight detected is nominally unchanged but variable while traveling.

In an embodiment, a truck 920 unloads to a grain bin 914 through a grain auger 912. While the truck 920 is unloading to a grain bin 914 through a grain auger 912, the truck 920 is stationary and the weight decreases. The position of the grain auger 912 is detected as stationary and vibration is detected while it is operating. By locating the positional sensor at the discharge end of the grain auger 912, the location of the grain discharged may be detected, and correlated with the location of a grain bin 914 or other storage facility. Alternatively, or in addition thereto, the positional sensor may be located elsewhere on the grain auger 912, and the location of the discharge end may be determined by measuring the position and the orientation of the positional sensor, and by knowing the relative geometry between the positional sensor and the grain auger 912. Additionally, if the orientation of the grain auger 912 is known from the positional sensors, a spatial intersection of an azimuth vector along the length of the grain auger 912 with a polygon representing the location of the truck 920 may be calculated to further qualify a specific truck as the source of the transfer. If the truck 920 unloads without an instrumented auger, such as at a grain terminal/elevator 910, the location of the unload is located where the truck 920 is positioned during the unload. This allows the source of the transfer to be recorded as the truck 920, and the destination recorded as the position of either the truck 920 or the discharge end of the grain auger 912 if an instrumented auger is detected and correlated with the transfer event.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the described embodiments should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method of recording an amount of material transferred to or from a machine operative to transport the material, the method comprising:

receiving, by a processor from a vibrational sensor coupled therewith and further affixed to the machine, data indicative of at least one vibrational characteristic thereof;

determining, by the processor based on the data indicative of at least one vibrational characteristic of the machine, whether the machine is starting to transfer material thereto or therefrom or stopping transfer of material thereto or therefrom; and when the processor has determined that the machine has started or stopped transferring material thereto or therefrom, communicating the determination to a receiver operative to determine the amount of material transferred between the starting and stopping of the transfer of material.

2. The computer implemented method of claim 1, wherein the vibrational sensor further comprises a GPS sensor.

3. The computer implemented method of claim 1, wherein the machine comprises a grain cart.

4. The computer implemented method of claim 1, wherein the receiver comprises wireless device.

5. The computer implemented method of claim 1, wherein the receiver comprises a remote server.

6. The computer implemented method of claim 1, wherein the receiver comprises a mobile device.

7. The computer implemented method of claim 1, wherein the determination of the amount of material transferred comprises determining a change in amount between a first time when the machine is first determined to be starting to transfer and a second time when the machine is subsequently determined to be stopping transferring.

8. The computer implemented method of claim 1, further comprising affixing, prior to the receiving, the vibrational sensor to the machine.

9. A system for recording an amount of material transferred to or from a machine operative to transport material, the system comprising:

a vibrational sensor operative to be affixed to the machine and further operative to generate data indicative of at least one vibrational characteristic thereof;

a processor configured to be coupled with the vibrational sensor and operative to determine, based on the data indicative of at least one vibrational characteristic of the machine, whether the machine is starting to transfer material thereto or therefrom or stopping transfer of material thereto or therefrom; and a communications interface, coupled with the processor, the processor being further operative to communicate via the communications interface, when the transfer has started or ended, to a receiver operative to determine the amount of material transferred between the starting and stopping of the transfer of material.

10. The system of claim 9, wherein the vibrational sensor further comprises a GPS sensor.

11. The system of claim 9, wherein the machine comprises a grain cart.

12. The system of claim 9, wherein the receiver comprises wireless device.

13. The system of claim 9, wherein the receiver comprises a remote server.

14. The system of claim 9, wherein the receiver comprises a mobile device.

15. The system of claim 9, wherein the determination of the amount of material transferred comprises determining a change in amount between a first time when the machine is first determined to be starting to transfer and a second time when the machine is subsequently determined to be stopping transferring.

16. The system of claim 9, wherein the vibrational sensor is operative to be affixed to the machine subsequent to manufacture of the machine.

17. A system for recording an amount of material transferred to or from a machine operative to transport material, the system comprising:

a vibrational sensor operative to be affixed to the machine and further operative to autonomously generate data indicative of at least one vibrational characteristic thereof, the vibrational sensor including a processor and a communications interface coupled therewith the processor operative to determine, based on the data indicative of at least one vibrational characteristic of the machine, whether the machine is starting to transfer material thereto or therefrom or stopping transfer of material thereto or therefrom, and communicate, via the communications interface, the determination to a remote device.

18. The system of claim 17, wherein the vibrational sensor further comprises a GPS sensor.

19. The system of claim 17, wherein the machine comprises a grain cart.

20. The system of claim 17, wherein the communications interface comprises a wireless interface, the remote device comprising a wireless device.

21. The system of claim 17, wherein the remote is operative to determine the amount of material transferred based on a change in amount between a first time when the machine is first determined to be starting to transfer and a second time when the machine is subsequently determined to be stopping transferring.

* * * * *